United States Patent
Kataoka et al.

(10) Patent No.: US 7,300,958 B2
(45) Date of Patent: Nov. 27, 2007

(54) ULTRA-DISPERSED NANOCARBON AND METHOD FOR PREPARING THE SAME

(75) Inventors: Fumiaki Kataoka, Chiba (JP); Eiji Osawa, Chiba (JP); Takahiro Fujino, Kochi (JP); Makoto Takahashi, Chiba (JP); Osamu Idohara, Kanagawa (JP); Akira Terajima, Kanagawa (JP); Yoshiaki Inoue, Kanagawa (JP); Seiji Yokota, Kanagawa (JP); Kazuhiro Kawasaki, Kanagawa (JP)

(73) Assignees: Futaba Corporation, Chiba (JP); Nanocarbon Research Institute Ltd., Chiga (JP); Neturen Co., Ltd., Tokyo (JP)

( * ) Notice: Subject to any disclaimer, the term of this patent is extended or adjusted under 35 U.S.C. 154(b) by 419 days.

(21) Appl. No.: 10/847,453

(22) Filed: May 18, 2004

(65) Prior Publication Data

US 2005/0008560 A1   Jan. 13, 2005

(30) Foreign Application Priority Data

May 20, 2003   (JP) .............. 2003-141618

(51) Int. Cl.
 *B01F 3/12* (2006.01)
 *B01F 17/00* (2006.01)

(52) U.S. Cl. .............. 516/32; 516/20; 516/901; 516/924; 977/734; 977/735; 977/742

(58) Field of Classification Search .............. 516/32
See application file for complete search history.

(56) References Cited

U.S. PATENT DOCUMENTS

| | | | | |
|---|---|---|---|---|
| 2,045,501 A | * | 6/1936 | Von Mandelsloh | 516/32 |
| 3,663,475 A | * | 5/1972 | Figiel | 516/32 |
| 4,775,553 A | * | 10/1988 | Kovacs et al. | 427/128 |
| 6,692,718 B1 | * | 2/2004 | Osawa | 423/448 |
| 2005/0116602 A1 | * | 6/2005 | Iijima et al. | 313/311 |

FOREIGN PATENT DOCUMENTS

WO   WO 00/73206 A1  * 12/2000
WO   WO 03/023806 A1  * 3/2003

OTHER PUBLICATIONS

Perry, Robert H. et al., Size Reduction and Size Enlargement, Perry's Handbook, Seventh Edition, 1997, Table 20-18, p. 20-38.*

* cited by examiner

*Primary Examiner*—Randy Gulakowski
*Assistant Examiner*—Timothy J. Kugel
(74) *Attorney, Agent, or Firm*—Sughrue Mion Pllc.

(57) ABSTRACT

Ultradispersed ones of primary particles of nanometer-sized carbon are obtained by applying a wet-type milling method and/or a wet dispersion method to an aggregate structure of the primary particles to overcome van der Waals forces, by which forces the primary particles are held together to form the aggregate structure, whereby the ultradispersed primary particles are obtained in a colloidal dispersion on a large-scale basis at low cost without using any additive. In a method of manufacturing the ultradispersed primary particles, the wet-type milling method is carried out in a ball mill, preferably in combination with a high-energy ultrasonic-wave process carried out in a dispersing medium such as pure water, whereby a colloidal solution or slurry with a low-concentration of the primary particles ultradispersed in the dispersing medium is obtained.

12 Claims, 11 Drawing Sheets

4 nm

40 Å

25nm  400,000×

Photo.1 TEM image        100nm

Photo.1 TEM image 100nm

ULTRA-DISPERSED NANOCARBON AND METHOD FOR PREPARING THE SAME

BACKGROUND OF THE INVENTION

1. Field of the Invention

The present invention relates to: an ultradispersed one of primary particles of nanometer-sized carbon (hereinafter referred to as "nanocarbon"); a method of manufacturing the ultradispersed primary particle of the nanocarbon; techniques and/or their practical applications for preventing these primary particles of the nanocarbon from recombining with each other after they are ultradispersed.

2. Description of the Related Art

In the era of nano-technology or of ultimate High Technology, it is one of the most important issues to establish fundamental techniques for manufacturing, evaluating, measuring, reserving and appropriately treating a nanometer-sized material having a diameter of approximately $10^{-9}$ meter.

In general, methods for manufacturing the nanometer-sized material are classified into two categories: one of which is a so-called "bottom-up or build-up method"; and, the other is a so-called "top-down or break-down method".

In the bottom-up method: a starting material is the minimum-sized material such as an atom or a molecule; atoms and molecules are then permitted to combine with each other by their self-organizing mechanism and like mechanisms to become bigger in size step by step.

On the other hand, in the top-down method, a starting material is a relatively large bulk or mass of material, which is gradually broken down into smaller pieces in size by grinding, crushing, cutting and like pulverizing processes.

In any one of these methods, regardless of the types of material, when the material reaches an approximately nanometer-sized particle, these particles begin to combine with each other by their self-organizing mechanism to grow up to an assembly having a diameter of from approximately several micrometers to approximately several millimeters, in general. In contrast with an assembly or aggregate structure of conventional fine particles, the assembly or an aggregate structure of the nanometer-sized particles looks like a solid cluster in behavior once the assembly has been formed. Such assembly of the nanometer-sized particles is hard to break down and operates as a single large solid particle, so that it is difficult for the primary particle of nanometer-sized carbon to present its own functional properties. Due to this, the self-organizing mechanism of the nanometer-sized particle is a fatal obstacle to development of the fundamental techniques in the field of nano-technology. However, there is still not found an essential solution for this problem in the prior art. Consequently, in the prior art, in order to prevent the nanometer-sized particles from combining with each other by the self-organizing mechanism, a low concentration of the nanometer-sized particles is exclusively produced in gas phase. This is true, particularly, with respect to nanometer-sized metal particles.

Now, technical terms used herein will be described in detail.

a) Ultradispersed primary particles of nanometer-sized carbon (hereinafter referred to as "nanocarbon"):

Known as the nanocarbon in the prior art are: fullurenes such as C60 fullerene and like fullerenes; carbon nanohorns; carbon nanotubes; nanodiamond; and, primary particles of carbon black. Consequently, the ultradispersed nanocarbon means all the above-mentioned ultradispersed carbon materials.

b) Van der Waals aggregation or an aggregate structure formed by van der Waals forces:

This term means an interparticle aggregate structure formed by van der Waals-London type dispersion forces exerted between atoms and molecules.

c) Detonation-method diamond:

In an inert medium atmosphere, an explosive with a composition containing carbon but no oxygen is detonated without any additional carbon to produce soot in which ultrafine diamond particles are contained in high concentration. Retrieved from such soot is the detonation-method diamond consisting of the ultrafine diamond particles or powder.

d) An agglutinate structure:

Examples of an agglutinate structure is shown in FIGS. 1 and 2, in each of which: an aggregate structure of primary particles wrapped with a plurality of layers of graphite is shown. Such aggregate structure is hereinafter referred to as the agglutinate structure in order to distinguish them from other aggregate structures, for example such as an aggregate structure in which the primary particles of nanocarbon are held together by van der Waals forces. More specifically, in the agglutinate structure of the primary particles, the graphite layers are deposited on surfaces of the primary particles to wrap them. Since graphite is the most stable form in carbon state at room temperature and atmospheric pressure, graphite is deposited on the surfaces of the primary particles when the particles of nanocarbon is prepared by the so-called bottom-up method.

e) Carbon nanohorns:

As shown in FIG. 3a, the carbon nanohorn is a modification of a carbon nanotube which assumes a conical shape. As is clear from FIG. 3a, the nanohorn is extremely short in longitudinal length and available in mass production without using any catalyst. Therefore, the nanohorn has a large number of advantageous applications in use. As is in any one of the other types of fullerenes, this interesting structure of the nanohorn is characterized in the presence of a pentagonal shape in a network formed by a plurality of hexagonal shapes. More specifically, although the nanotube has 6 pieces of the pentagonal shapes in each of its opposite cap portions, the nanohorn has only one cap portion which is provided with 5 pieces of the pentagonal shape. Further, in the nanohorn, due to the reason for geometric requirements of the shape, the nanohorn assuming the conical shape has a vertex angle of 19.2 degrees and is opened in bottom. In practical, it is not possible to obtain the individual nanohorn. An available product of the nanohorns is a dahlia-like covalently-bonded assembly of the nanohorns. In this macro assembly, all the nanohorns have their vertex portions oriented outward.

f) Assembly of the carbon nanohorns:

In the assembly of carbon nanohorns, the carbon nanohorns are assembled into the assembly in a manner different from that of the nanodiamond and carbon black. More specifically, as shown in FIG. 3a, when the primary particles of cone-type carbon nanohorn grow along a peripheral portion of the bottom surface of the cone, the number of dangling bonds increases to make it difficult to supply a sufficient amount of atomic carbon, so that the interparticle combination of the primary particles begins to appears. Due to the influence of their conical shapes, the carbon nanohorns are combined with each other in their head portions so that the nanohorns have their vertex portions oriented always outward. Due to such combination manner, the assembly of the carbon nanohorns keeps on growing until the assembly completes a dahlia-like round bulb shape in its vertex portion radially outwardly extended, as shown in FIG. 3a. The combination of the carbon nanohorns described above forms a structure which is quite different from any other aggregate structure and any agglutinate structure, so that such combination of the carbon nanohorns will be hereinafter referred to as "bonded assembly" of the carbon nanohorns.

g) An assembly:

The assembly means any one of the aggregate structures, the agglutinate structures and the bonded assemblies.

h) Breaking-up, Disagglutination and Decomposition:

These terms mean destruction or separation of the assembly of the primary particles of nanocarbon.

i) Example of the-wet dispersion method corresponding to the wet-type milling method:

Slurry of a powder workpiece is ejected and divided into two jet streams. They undergo a so-called "jet collision". In the jet collision, the two jet streams of the slurry are subjected to counter collision with each other for pulverization of the workpiece. This process is called the "jet-ejection process", in which the workpiece is pulverized by its own kinetic energy. There is another pulverization process called the "thin-film process", in which the slurry of the workpiece is rotated at ultra-high speed. More specifically, in this thin-film process, the slurry is accelerated by a special stirring blade to an ultra-high speed and therefore urged to spread into a thin film over an inner peripheral wall of a rotating tank, so that the powder work piece is effectively subjected to shearing stress exerted by the stirring blade, whereby the workpiece is finely pulverized.

In practice, it is possible to use the wet-type milling method only or in combination with the wet dispersion method.

Now, the reason why the primary particles of nanocarbon are remarkably self-organized will be described.

One of the well-known reasons is the size effect of the nanometer-sized particle (hereinafter referred to as "nanoparticle") itself. In other words, as the number of atoms disposed in the surface of the particle becomes much lager than that of atoms disposed inside the particle, the surface active properties of the nanoparticle such as absorption, association and reaction remarkably appear. This is particularly true in the most useful material "carbon" in the field of nanotechnology engineering. Since carbon is an atom considerably flexible in valence when combined with other elements or atoms to form a chemical compound or molecule, it is possible for carbon atoms to form a plurality of structures composed of carbon atoms, this complicates the matter. In fact, until recently, the inventors of the subject application have found, through their extensive investigations using a transmission electron microscope (TEM) and/or a the scanning electron microscope (SEM), that all the firm aggregate structures of the primary particles of nanocarbon material fail to exert their own material properties inherent in the material, wherein: the material is manufactured by the so-called "bottom-up" method; and, the investigations are also conducted as to the particle size distribution of the primary particles of the material. It is essential for the today's nanotechnology engineering to establish an effective technique for breaking-up or disassembling the assemblies of the primary particles of nanocarbon.

Technique for manufacturing a diamond particle having a diameter of approximately several tens nm have been already established in the art for abrasive use. These conventional techniques are disclosed in, for example, Japanese Patent application Laid-Open Nos.: Hei 4-132606 (which corresponds to 1992-132606); and, 2002-35636, wherein these conventional techniques are applied to a micron-sized diamond particle having been statically manufactured within the normal range of ambient temperature and pressure, so that the micron-sized diamond particle is ultra-finely pulverized to become an ultra-fine diamond particle. However, the thus obtained diamond particles or powder inevitably includes a diamond particle much larger in size than the micron-sized diamond particle. Furthermore, such larger diamond particle is hard to remove from the pulverized diamond powder. The possible minimum diameter of the thus obtained ultra-fined diamond particles is approximately several tens nm due to the presence of limits inherent in the conventional techniques.

There is also known another conventional method for breaking up the aggregate structure of the primary particles of C60 carried by graphite in large quantities at one step. In the another conventional method: first, the aggregates (which mean the aggregate bodies or structures) of C60 fullerenes in graphite are mixed with both an organic solvent and water to prepare a mixture until C60fullerenes reaches its saturated concentration in this mixture, wherein the organic solvent may be pyridine, tetrahydrofuran or any other suitable solvent; then, a large quantity of water is added to this mixture to prepare a diluted mixture; and, finally, the thus obtained diluted mixture is subjected to an ultrasonic treatment to forcibly remove the organic solvent by vaporization of the solvent to obtain the primary particles of C60 fullerene. However, even in this method, the possible maximum concentration of C60 fullerenes still remains at a value of only 1.4 g/liter (20 mM), as disclosed in a document titled: "Andreivsky, G. V. et al. ; Chem. Phys. Lett.; 2002, 364, 8."

SUMMARY OF THE INVENTION

Under such circumstances, the present invention was made to solve the problems inherent in the prior art. Consequently, it is an object of the present invention to provide an effective measure to make sure that primary particles of nanometer-sized carbon do not combine or aggregate with each other to form a firm aggregate structure in view of the fact that substantially all the primary particles of nanometer-sized carbon having been manufactured through a conventional "bottom-up method" aggregate with each other to form such a firm aggregate structure, without fail. Further, it is another object of the present invention to establish a safety measure or techniques to make sure that the thus obtained primary particles of nanometer-sized carbon are effectively stored and transported. These measures are established on the basis of novel findings of true properties of the firm aggregate structure of the various types of nanometer-sized carbon.

In accordance with a first aspect of the present invention, the above objects of the present invention are accomplished by providing:

An ultradispersed one of primary particles of nanometer-sized carbon, CHARACTERIZED IN THAT: the ultradispersed primary particle is obtained by applying a wet-type milling method and/or a wet dispersion method to an aggregate structure of the primary particles of nanometer-sized carbon to overcome van der Waals forces, by which forces the primary particles of nanometer-sized carbon are held together to form the aggregate structure.

In accordance with a second aspect of the present invention, the above objects of the present invention are accomplished by providing:

A method of manufacturing an ultradispersed one of primary particles of nanometer-sized carbon, CHARACTERIZED IN THAT: the ultradispersed primary particle is obtained by applying a wet-type milling method and/or a wet dispersion method to an aggregate structure of the primary particles of nanometer-sized carbon to overcome van der Waals forces, by which forces the primary particles of nanometer-sized carbon are held together to form the aggregate structure.

In accordance with a third aspect of the present invention, the above objects of the present invention are accomplished by providing:

An ultradispersed one of primary particles of nanometer-sized carbon, CHARACTERIZED IN THAT: the ultradispersed primary particle is obtained by applying a wet-type milling method and/or a wet dispersion method to an agglutinate structure of the primary particles of nanometer-sized carbon to break up the agglutinate structure, wherein the agglutinate structure is of an inclusion-type with thin layers of highly defective graphitic curved layers surrounding core nanocarbon particles.

In accordance with a fourth aspect of the present invention, the above objects of the present invention are accomplished by providing:

A method of manufacturing an ultradispersed one of primary particles of nanometer-sized carbon, CHARACTERIZED IN THAT: the ultradispersed primary particle is obtained by applying a wet-type milling method and/or a wet dispersion method to an agglutinate structure of the primary particles of nanometer-sized carbon to break up the agglutinate structure, wherein the agglutinate structure is of an inclusion-type with thin layers of highly defective graphitic curved layers surrounding core nanocarbon particles.

In accordance with a fifth aspect of the present invention, the above objects of the present invention are accomplished by providing:

An ultradispersed one of primary particles of nanometer-sized carbon, CHARACTERIZED IN THAT: the ultradispersed primary particle is obtained by applying a wet-type milling method and/or a wet dispersion method to a high-order interparticle direct covalently-bonded structure of the primary particles of nanometer-sized carbon to decompose the covalently-bonded structure.

In accordance with a sixth aspect of the present invention, the above objects of the present invention are accomplished by providing:

A method of manufacturing an ultradispersed one of primary particles of nanometer-sized carbon, CHARACTERIZED IN THAT: the ultradispersed primary particle is obtained by applying a wet-type milling method and/or a wet dispersion method to a high-order interparticle direct covalently-bonded structure of the primary particles of nanometer-sized carbon to decompose the covalently-bonded structure.

In accordance with a seventh aspect of the present invention, the above objects of the present invention are accomplished by providing:

A mono-molucular dispersed one of fullerenes, CHARACTERIZED IN THAT: the one of fullerenes is obtained by applying a wet-type milling method and/or a wet dispersion method to an aggregate structure of the fullerences comprising black powders of C60fullerene, C70 fullerene and of other fullerenes, whereby van der Waals forces by which the fullerenes are held together to form the aggregate structure are overcome.

In accordance with an eighth aspect of the present invention, the above objects of the present invention are accomplished by providing:

A method of manufacturing a mono-molucular dispersed one of fullerenes, CHARACTERIZED IN THAT: the one of fullerenes is obtained by applying a wet-type milling method and/or a wet dispersion method to an aggregate structure of the fullerences comprising black powders of C60 fullerene, C70 fullerene and of other fullerenes, whereby van der Waals forces by which the fullerenes are held together to form the aggregate structure are overcome.

In accordance with a ninth aspect of the present invention, the above objects of the present invention are accomplished by providing:

An ultradispersed one of primary particles of graphite, CHARACTERIZED IN THAT: the ultradispersed primary particle of graphite is obtained by applying a wet-type milling method and/or a wet dispersion method to an agglutinate structure of a super anti-abrasive carbon black to break up the agglutinate structure, wherein the agglutinate structure is of an inclusion-type with thin layers of highly defective graphitic curved layers surrounding core graphite particles.

In accordance with a tenth aspect of the present invention, the above objects of the present invention are accomplished by providing:

A method of manufacturing an ultradispersed one of primary particles of graphite, CHARACTERIZED IN THAT: the ultradispersed primary particle of graphite is obtained by applying a wet-type milling method and/or a wet dispersion method to an agglutinate structure of a super anti-abrasive carbon black to break up the agglutinate structure, wherein the agglutinate structure is of an inclusion-type with thin layers of highly defective graphitic curved layers surrounding core graphite particles.

In accordance with an eleventh aspect of the present invention, the above objects of the present invention are accomplished by providing:

An ultradispersed one of primary particles of nanometer-sized diamond, CHARACTERIZED IN THAT: the ultradispersed primary particle is obtained by applying a wet-type milling method and/or a wet dispersion method to an agglutinate structure of nanometer-sized synthetic diamond powder manufactured by a shock wave synthesis procedure, whereby the agglutinate structure is broken up to provide the ultradispered primary particles of nanometer-sized diamond, wherein the agglutinate structure is of an inclusion-type with thin layers of highly defective graphitic curved layers surrounding core nanodiamond particles.

In accordance with a twelfth aspect of the present invention, the above objects of the present invention are accomplished by providing:

A method of manufacturing an ultradispersed one of primary particles of nanometer-sized diamond, CHARACTERIZED IN THAT: the ultradispersed primary particle is obtained by applying a wet-type milling method and/or a wet dispersion method to an agglutinate structure of nanometer-sized synthetic diamond powder manufactured by a shock wave synthesis procedure, whereby the agglutinate structure is broken up to provide the ultradispered primary particles of nanometer-sized diamond, wherein the agglutinate structure is of an inclusion-type with thin layers of highly defective graphitic curved layers surrounding core nanodiamond particles.

In accordance with a thirteenth aspect of the present invention, the above objects of the present invention are accomplished by providing:

An ultradispersed one of primary particles of nanometer-sized horn, CHARACTERIZED IN THAT: the ultradispersed primary particle is obtained by applying a wet-type milling method and/or a wet dispersion method to a high-order interparticle direct covalently-bonded dahlia-like structure of the primary particles to decompose the dahlia-like structure.

In accordance with a fourteenth aspect of the present invention, the above objects of the present invention are accomplished by providing:

A method of manufacturing an ultradispersed one of primary particles of nanometer-sized horn, CHARACTERIZED IN THAT: the ultradispersed primary particle is obtained by applying a wet-type milling method and/or a wet dispersion method to a high-order interparticle direct covalently-bonded dahlia-like structure of the primary particles to decompose the dahlia-like structure.

In the method of manufacturing as set forth in any one of the eighth to the fourteenth aspects, preferably the structure is subjected to the wet-type milling method and/or the wet dispersion method in water or in an organic solvent.

Further, in the method of manufacturing as set forth in any one of the eighth to the fourteenth aspects, preferably, after completion of the wet-type milling method and/or the wet dispersion method, the primary particles of nanometer-sized carbon are subjected to an ultrasonic treatment, whereby the primary particles of nanometer-sized carbon are prevented from recombining with each other.

Still further, in the method of manufacturing as set forth in any one of the eighth to the fourteenth aspects, preferably, after completion of the wet-type milling method and/or the wet dispersion method, the primary particles of nanometer-sized carbon are subjected to an ultrasonic treatment, whereby the primary particles of nanometer-sized carbon are prevented from recombining with each other, wherein the structure is subjected to the wet-type milling method and/or the wet dispersion method in water or in an organic solvent.

Further, in the method of manufacturing as set forth in any one of the eighth to the fourteenth aspects, preferably the wet-type milling method is carried out in an agitator at a peripheral velocity of equal to or more than 5 m/sec with the use of ceramic balls or metallic balls each of which has a diameter of equal to or less than 0.1 mm.

Still further, in the method of manufacturing as set forth in any one of the eighth to the fourteenth aspects, preferably the wet-type milling method is carried out in a solvent having active hydrogen atoms to prevent the primary particles from recombining with each other.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments and Examples of the present invention with reference to the accompanying drawings.

The present invention may, however, be embodied in various different forms and should not be construed as limited to the embodiments set forth herein; rather, these embodiments are provided so that this disclosure will be thorough and complete, and will fully convey the scope of the present invention to those skilled in the art.

First, the technical background required to understand the present invention will be described in detail.

As for interesting nanocarbon, there are various types of the nanocarbon. Of these types, typical ones are: C60 fullerene; carbon black; nanodiamond manufactured by the detonation method; and, carbon nanohorns.

Figure 4:
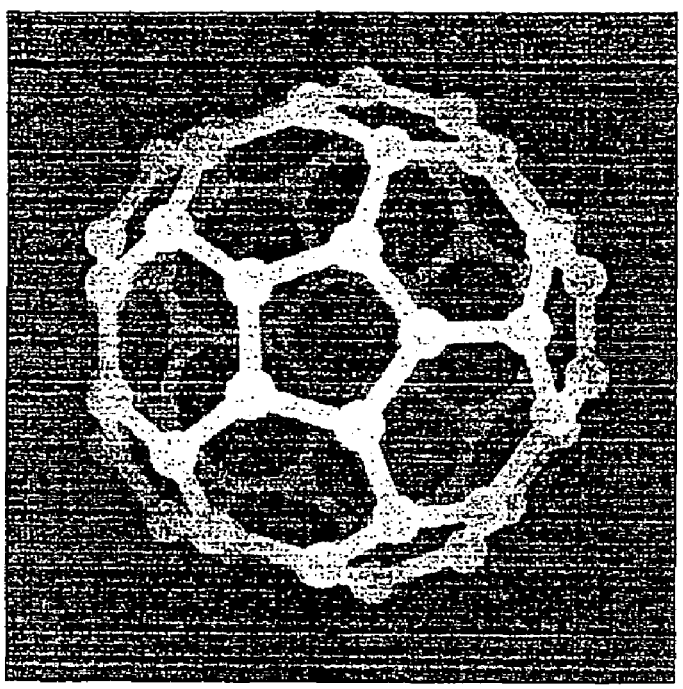
FIG. 4 is a photograph of C60 flurren, illustrating its structure.

As shown in FIG. 4, C60 fullerene is the minimum-sized one of fullerenes. An effective diameter of C60 fullerene is approximately 1 nm. C60 fullerene is soluble in an organic solvent. A saturated solution of C60 fullerene is light bluish purple in color. In contrast with this, a commercially available specimen of C60 fullerene looks like a powder as fine as soot in appearance and as black as soot in color. Due to such color and appearance, it is clear that the commercially available specimen of C60 fullerene is composed of firm assemblies or aggregate structures of C60fullerene. The specimen is investigated in detail through appropriate techniques such as: "dynamic laser light scattering method (DLS)"; a transmission electron microscopy (TEM); a scanning electron microscopy (SEM); and, an atomic force microscopy (AFM). As a result, it is found that each of the aggregate structures reaches approximately 10 microns in mean size. C60 fullerenes each being a hollow mono-layer non-polar molecule are held together only by van der Waals forces to form their aggregate structure. Since each C60 fullerene is a spherical molecule, its aggregation efficiency is high. Due to this, as for its packing efficiency, C60 fullerene is estimated substantially to reach the so-called "face-centered cubic crystal structure". Therefore, it is possible for C60fullerenes to form an aggregate structure thereof. This aggregation structure has a relatively large amount of aggregation energy to have approximately 12 pieces of C60 fullerenes disposed adjacent to a centered one of C60 fullerenes within a space of approximately 1-nm (or slightly more) radius from the centered C60 fullerene. In the aggregate structure, however, each C60 fullerene or molecule is brought into mere point-contact with adjacent ones of C60fullerenes or molecules. Due to this, it is estimated that the aggregate structure of C60 fullerene can be disassembled when the structure is subjected to a sufficiently large amount of energy, provided that: as will be described later, it is necessary to disassemble the aggregation structure in water or in an organic solvent to prevent the thus obtained C60 fullerence from recombining with each other and to reserve the thus obtained C60 fullerenes in a form of colloids or slurries, because powdery C60 fullerenes begin to recombine with each other into an aggregate structure when left alone after disassembling of the aggregate structure. This is true in any other nanocarbon materials as well as C60 fullerene. The gist of the present invention resides in that such nanocarbon materials including C60 fullerene are released from their aggregate structures in water or an organic solvent and reserved as colloids or slurries of the materials.

Figure 1:
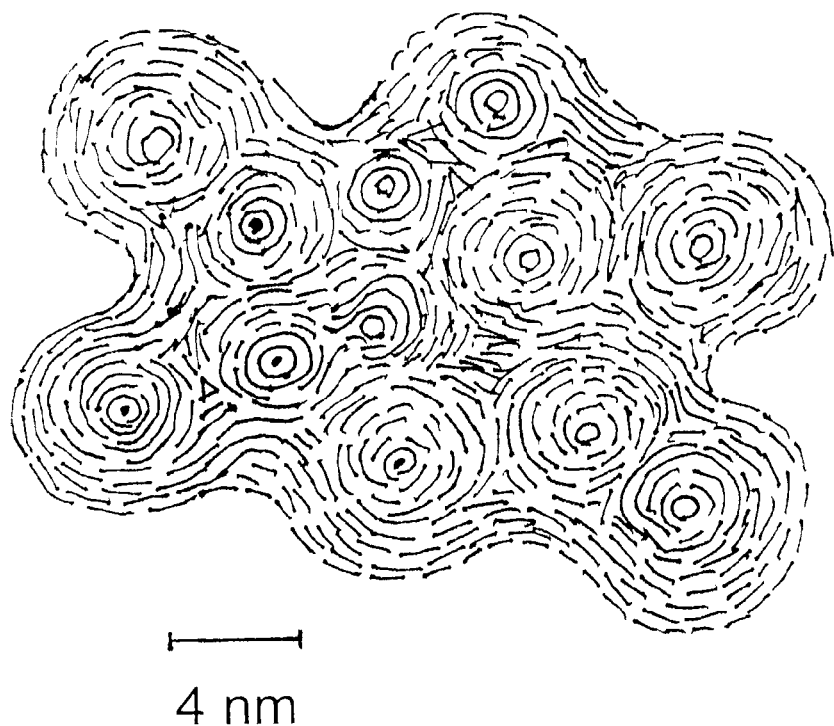
FIG. 1 is a schematic diagram of a firm assembly of primary agglutinates of carbon black.

Carbon black is pure soot manufactured in industries. In chemical term, carbon black is composed of graphite particles. It is well known that the minimum-sized primary particle of carbon black is a nanometer-sized ultra-fine particle. Carbon black discussed here is composed of such primary particles, defined in ASTM code "N110" and used as an ultra anti-abrasive rubber additive, as described below. Discussion here is more or less applicable to the other classes of carbon black. The primary particle of carbon black of the class (code) "N110" has a mean diameter of approximately 18 nm. It is know that several tens of such primary particles of carbon black aggregate to form a primary agglutinate structure called "agglutinate". FIG. 1 shows a schematic diagram of the agglutinate structure of the primary particles of carbon black. In this agglutinate structure shown in FIG. 1, a plurality of the primary particles of carbon black is wrapped with a plurality of modified graphite layers each suffering from many structural defects. In FIG. 1, it is unclear where the boundary between the primary particles and the graphite layers is.

In this agglutinate structure of carbon black of FIG. 1, in contrast with the aggregate structure of the primary particles of C60 fullerene held together only by interparticle van der Waals forces, the primary particles of carbon black are held together very firmly due to the presence of the thin layers of highly defective graphitic curved layers surrounding core nanocarbon particles. Consequently, due to the above reasons, in place of the conventional term "aggregate", the term "agglutinate" is used here to express such very firm hold by the wraps of graphite layers, which forcibly hold the primary particles of carbon black together to form a strong assembly.

It seems that agglutination of the primary particles of carbon black occurs already in production of carbon black. As the primary particles are formed and increased in concentration, interparticle collision between the primary particles increases and temperature decreases. Consequently, in formation of the agglutinate structure, its graphite layers growing over the surfaces of the primary particles become poor in crystallization degree to increase their structural defects. Due to this, the graphite layers are often shared between the adjacent ones of the primary particles to facilitate formation of the agglutinate structure of the primary particles of carbon black.

This type of agglutination is widely observed in manufacturing various types of nanocarbon structures according to the so-called "bottom-up" method, provided that the method is carried out so as to permit additional production of a sub-product such as a graphite-type $sp^2$ hybrid carbonic laminar structure, wherein this carbonic laminar structure is one of stable forms of carbon within the normal range of ambient temperature and atmospheric pressure.

In general, it is very difficult to break up the agglutinate structure of the primary particles of carbon black since there are required the breakage of C—C covalent bonding or link and the destruction of structural defects in the agglutinate structure. In other words, in breaking-up of the agglutinate structure, there is observed substantially no effect on the agglutinate structure in an ordinary disassembling process, for example such as a conventional pulverizing process, a light radiation process using ultrasonic waves and like ordinary processes.

Figure 5A:
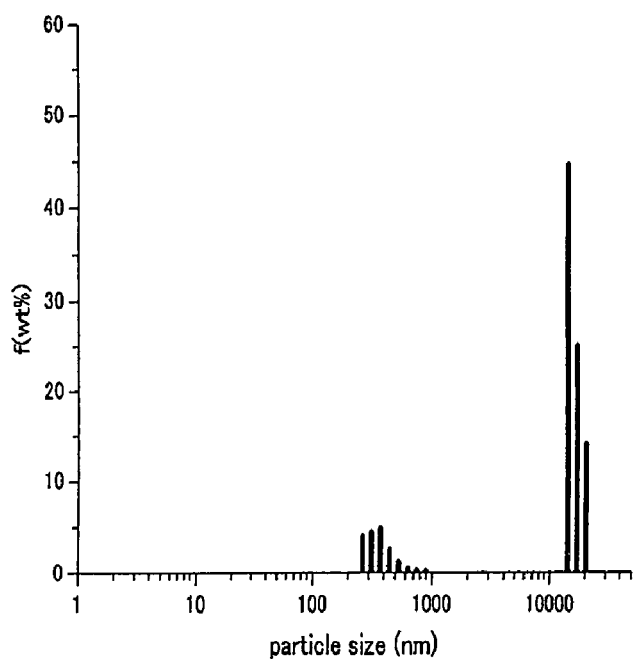
FIG. 5a is a diagram showing a particle-size distribution of commercially-available nanodiamond agglutinates (which mean agglutinate bodies or structures) dispersed in water, according to a Dynamic Laser Scattering (DLS) method used in determining the distribution.

The nanodiameond manufactured by the detonation method also forms one of typical agglutinate structures. It has been found through X-ray diffraction analyses that a mean diameter or size of crystal diamond is within a range of from 4 nm to 5 nm. On the other hand, as shown in FIG. 5a, it has been also found, through "particle-size distribution measurements" conducted by the DLS method, that a mean diameter or size of an assembly of particles of a commercially available diamond powder is a value of approximately 300 nm and/or of approximately 10 microns, wherein the commercially available diamond powder is said to be produced by having nanodiamond-containing raw soot subjected to hot nitric acid to refine the nanodiamonds through oxidization of the raw soot.

Figure 5B:
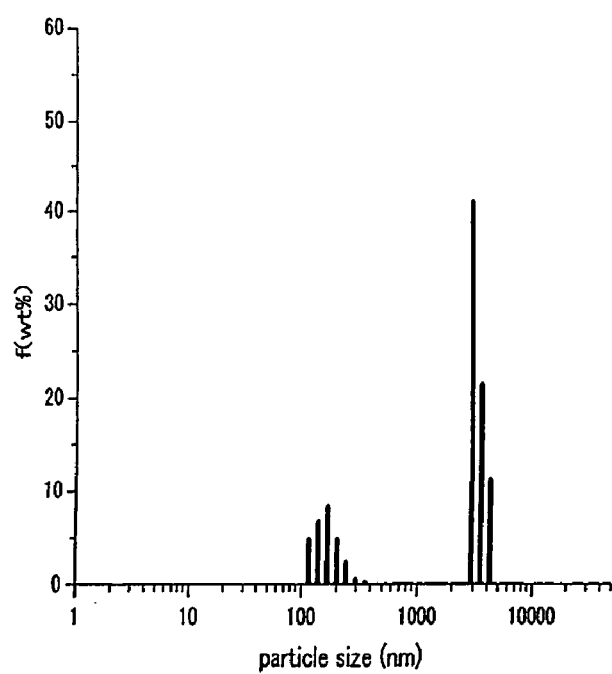
FIG. 5b is a diagram showing a particle-size distribution of commercially-available nanodiamond1 agglutinates, which are dispersed in water according to a Dynamic Laser Scattering (DLS) method used in determining the distribution and are identical in properties with those of FIG. 5a but additionally exposed to ultrasonic waves, illustrating no substantial difference between these diagrams of FIGS. 5a and 5b.

Such assemblies of the commercially available diamond powder were dispersed in water and kept in a conventional type 250-W powered ultrasonic bath for 4 hours in immersion state in water. However, as is clear from FIG. 5b, any primary particle of the assemblies of the commercially available diamond powder was not separated from the assemblies. When the assemblies of commercially available diamond powder are subjected to a 2 Kw-powered high-energy ultrasonic treatment for 4 hours in immersion state in water, a mean diameter of the assemblies decreases up to a value of approximately 200 nm. However, it is not possible to decrease the mean diameter of the assemblies beyond the above value even when the high-energy ultrasonic treatment is carried out for much more than 4 hours. In the diagrams shown in FIGS. 5a and 5b, the ordinate of each of the diagrams represents a weight reference distribution. In each of the diagrams shown in FIGS. 5a and 5b, a group of smaller bar graphs and another group of larger bar graphs will be hereinafter referred to as the "primary agglutinate structure" and the "secondary agglutinate structure", respectively. The primary agglutinate structure ranges in size or diameter from approximately 100 nm to approximately 200 nm. On the other hand, the secondary agglutinate structure ranges in size or diameter from approximately 2 microns to approximately 19 microns.

Figure 6:
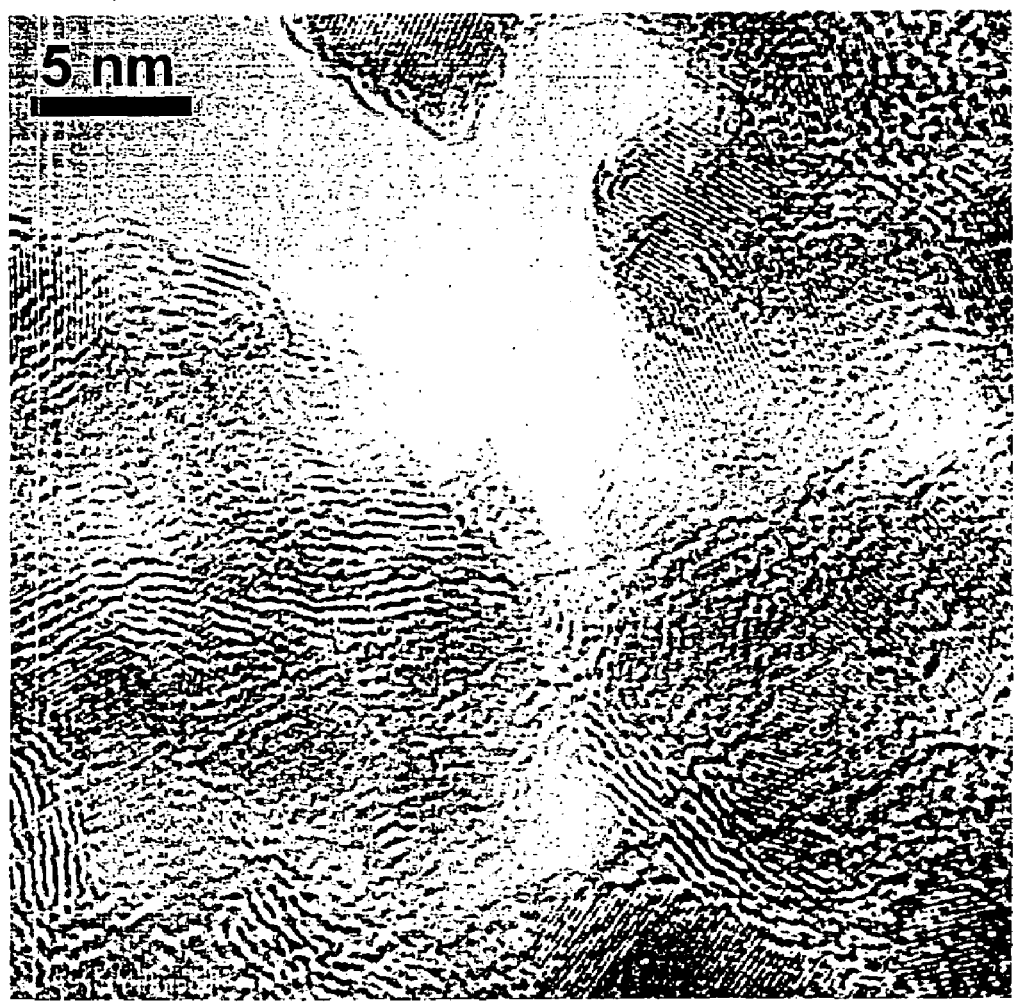
FIG. 6 is a field-emission cathode type transmission electron micrograph of raw soot obtained through an underwater detonation of a TNT-hexogen Composition B explosive.

Such raw soot has been inspected using TEM (transmission electron microscope) and found out that the raw soot contains a particle of nanodiamond ranging in diameter from 4 nm to 5 nm. As shown in FIG. 6, the thus found particle of nanodiamond is provided with a plurality of graphite layers in its surface. However, no independent "primary particle" of nanodiamond is not found in the raw soot. FIG. 6 shows that the primary particle of nanodiamond is already incorporated in a macro-agglutinate structure of nanodiamond. In other words, it seems that agglutination of nanodiamond is already completed immediately after completion of the detonation synthesis method of the nanodiamond. It seems that: nanodiamond is synthesized when carbonaceous materials, which are produced by incomplete combustion of an explosive mixed with other ingredients due to he lack of oxygen, is subjected to a detonation shock and therefore both a high temperature and a high pressure.

Figure 2:
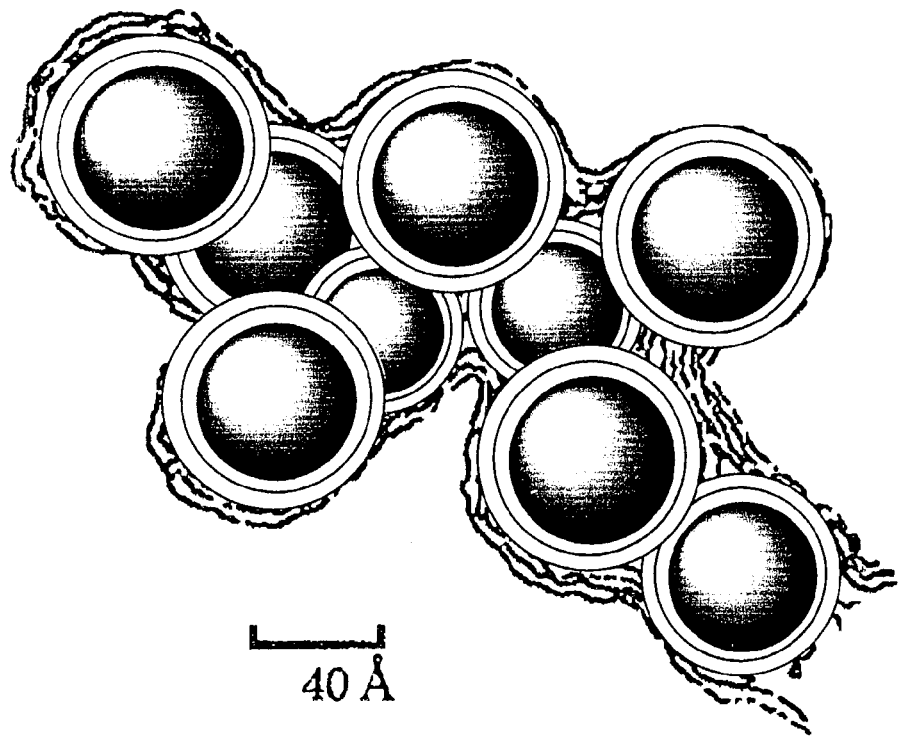
FIG. 2 is a schematic diagram of the agglutinate structure of the primary particles of the detonation-method nanometer-sized diamond ("nanodiamond")

In the detonation method for synthesizing the nanodiamonds: since the duration period of detonation shock is extremely short, it is not possible for the carbonaceous materials to remain in a diamond-synthesis phase region of a phase diagram (not shown) of the materials for a sufficient period of time. Due to this, once a core (i.e., primary particle) of nanodiamond is formed in the detonation method, such core or primary particle of nanodiamond fails to sufficiently grow up, so that such core's distribution area is also limited in range to a relatively narrow area of the phase diagram. After the detonation, the materials enter a graphite-phase region of the phase diagram. Developed in this graphite-phase region is graphite, which extends over the surface of each of the primary particles of the nanodiamond, whereby the primary particles of nanodiamonds agglutinate along with the thus developed graphite to form each of the primary agglutinates of the primary particles. FIG. 2 shows a schematic diagram of one of the primary agglutinates. As the temperature of the system decreases, a plurality of the primary agglutinates are held together by van der Waals forces, whereby the primary agglutinates thus held together become a larger assembly in size and are eventually formed into each of the secondary agglutinates each having a diameter of the order of microns.

It is difficult for the conventional method to disassemble the agglutinate structure (shown in FIG. 2) of the commercially available "detonation-method" type nanodiamond. Such difficulty makes it impossible to refine the "detonation-method" type nanodiamond for more than 20 years in the past.

The present invention is among the first to succeed in disassembling the agglutinate structure of "detonation-method" type nanodiamond.

Now, the last one of various assembly examples of carbon nanoparticles will be described, which last one is a bonded assembly of carbon nanohorns. As already described in the above, interhorn-bond is made always along a wider edge portion of each carbon nanohorn. Due to this, in order to avoid collision in space between the nanohorns thus bonded to each other in the bonded assembly, it is necessary for the nanohorns to be formed into a so-called "dahlia-like" structure in the assembly, where: the nanohorns have their vertex portions diametrically opposed to each other to permit the nanohorns to radially outwardly grow into a "dahlia-like" bonded assembly or structure (hereinafter, the assembly and the structure are interchangeably used since these two terms represent substantially the same concept). When a hollow central portion, which is closed in space and corresponds to a flower's receptacle in this "dahlia-like" structure, is formed, the bonded assembly is completed in growth. At this time, the "dahlia-like" structure of the assembly reaches a diameter of approximately 100 nm. Due to this, the spherical central portion of the assembly of carbon nanohorn is firm in construction, and therefore very hard to disassemble the assembly in the art. All the known material properties of the carbon nanohorn, for example such as hydrogen absorption, electron emission, catalytic activity and the like are resulted from a porous surface construction of the "dahlia-like" bonded assembly. In other words, one of the most interesting portions of the dahlia-like bonded assembly in use remains unused up to the present time, which one is an opening defined by the wider edge portion of each nanohorn of the assembly. An inner space of each nanohorn itself is another one of the most interesting portions of the assembly in use and also remains unused to date.

As is clear from the above analysis, the assembly of nanocarbons is classified in construction into at least three typical types, i.e., a first type assembly; a second type assembly; and, a third type assembly.

Now, these three typical types of the assemblies of nanocarbons will be described.

Re: First Type Assembly of Nanocarbons:

This type of assemblies is called "aggregate" (i.e., aggregate structure) of nanocarbons, wherein the nanocarbons are held together by van der Waals forces. Van der Waals force itself has been already clarified through studies of intermolecular interaction in the field of chemistry. Although individual interactive energy of van der Waals force working between a pair of atoms is slight in amount, the above-mentioned size effect works here for huge gain of aggregation energy as a whole. Due to such huge gain of aggregation energy, nanocarbons are firmly held together by the individual van der Waals forces to form the aggregate structure. On the other hand, as for color in appearance of C60 fullerene, C60 fullerene or molecule itself is blue or purple. However, a powder of C60 fullerenes, taken in bulk, is black in appearance. The reason why the powder of C60 fullerene, taken in bulk, is black is that: light is irregularly reflected from a surface of such a huge aggregate or assembly of the C60 fullerenes. As for lubricating properties of C60 fullerene, since individual C60 fullerene assumes a ball-like spherical shape having a diameter of approximately 1 nm, it is expected that a powder of C60 fullerenes is excellent in lubricating properties in nanometer-sized mechanism. Due to this expectation, the powder of C60 fullerene was applied to smooth surfaces to lubricate these surfaces. However, any expected effect of lubrication of the powder of C60 fullerenes was not observed between these smooth surfaces. As for the reason why the powder of C60 fullerenes fails to function as a lubricant, the inventors of the subject application have interpreted the reason in a manner such that: C60 fullerenes are held together in their aggregate structure by an unexpectedly huge amount of aggregation energy so that a conventional frictional operation fails to overcome such a huge aggregation energy.

It is necessary to apply a considerable amount of energy to the aggregate of C60 fullerenes in order to overcome van der Waals forces by which the C60 fullerens are hold together to form the aggregate. From a practical point of view, in order to overcome such van der Waals forces, it is effective to use: a high-energy ultrasonic irradiation conducted in water or in an organic solvent; and/or, a low-powered ball mill operated with the use of water or an organic solvent. For example, in order to pulverize a powder of C60 fullerenes, it is effective to use an ultrasonic irradiation operated at a frequency of equal to or more than 20 kHz and at a power of equal to or more than 500 W. As for the ball mill, it is necessary for the ball mill to use, as each of its balls, a ceramic or metallic ball having a diameter of equal to or less than 1 mm in a condition in which an agitator has its stirring blade rotatably driven at a peripheral velocity of equal to or more than 5 m/s.

The above is all the description of the first type assembly called "aggregate" of nanocarbon or carbon nanoparticles.

Now, the second type assembly of carbon nanoparticles will be described.

Re: Second Type Assembly of Nanocarbons:

This type of assemblies is called "agglutinate" (i.e., agglutinate structure) of carbon nanoparticles. In this second type assembly (i.e., agglutinate structure) of carbon nanoparticles, the carbon nanoparticles are firmly held together to form the agglutinate by agglutination forces much larger than van der Waals forces. Such agglutination forces are resulted from inter-particle C—C bonds and graphite wraps formed on these carbon nanoparticles. Due to this, in order to disassemble the agglutinate, it is necessary to break a large number of the inter-particle C—C bonds and also to remove the graphite wraps. From a practical point of view, in order to overcome such agglutination forces, it is effective to use the wet-type milling method, the jet-ejection process, and/or a thin-film method. For example, in disassembling the agglutinate of the "detonation method" type nanodiamonds, it is effective to use an agitator provided with a rotatably-driven stirring blade, a peripheral velocity of which blade is equal to or more than 5 m/s with the use of a large number of ceramic or metallic balls each having a diameter of from 0.1 mm to 0.05 mm.

The above is all the description of the second type assembly called "agglutinate" of nanocarbon or carbon nanoparticles.

Now, the third type assembly of carbon nanoparticles will be described.

Re: Third Type Assembly of Nanocarbons:

This type of assemblies is called "bonded assembly" of carbon nanoparticles. In this bonded assembly, the nanoparticles are chemically combined with each other. Due to this, the bonded assembly resembles the second type assembly (i.e., agglutinate) in its combination manner to a certain degree, provided that the bonded assembly lacks the graphite wraps or layers which exist in the bonded assembly to enhance agglutination of the nanoparticles in the second assembly.

In order to disassemble the bonded assembly, as is in the second assembly, it is necessary to break a large number of the inter-particle C—C bonds. Due to this, it is necessary to have the bonded assembly subjected to a severe process such as the wet milling method as is in the case of the agglutinate. When a vertex portion of each carbon nanohorn, which portion is low in mechanical strength, is incorporated in the third type assembly, it is necessary to take a suitable measure to protect such a vertex portion of each carbon nanohorns from destruction.

Such a suitable measure will be hereinbelow described with reference to each of the following Examples. Here, in any case, a dry-type treatment such as dry milling or grinding operation is strictly prohibited with respect to the assemblies described above, because much danger of a dust explosion and quick re-aggregation of the primary particles of nanocarbon are apprehended from the dry-type treatment of the assemblies.

Incidentally, although the nano-material is limited to carbon in description of the present invention, the method of the present invention is effective or more effective to any other nano-materials as well as carbon.

Until the present invention was made, the ultra dispersed carbon nanoparticle is not realized in a real sense except for C60 fullerene dispersered in a thin solution of an organic solvent. As for C60 fullerene or molecule, the molecule has a diameter of 0.7 nm. When an effective radius of van del Waals force of carbon exerted is considered, the C60 fullerene has an effective diameter of only 1 nm. This is the minimum size among the nanoparticles. Since C60 fullerene is slightly soluble in an organic solvent, it is possible to obtain an ultradispersed single piece of C60 fullerene in such thin solution of the organic solvent.

C60 fullerene and/or other larger fullerenes Cn, where "n" is an integer representing the number of carbon atoms contained in each fullerene and ranges from 70 to 100, are exceptionally smaller in size then any other nanoparticles. Consequently, these fullerenes should be treated as molecules belonging to the field of chemistry rather than as ordinary nanoparticles. On the other hand, all the ordinary nanoparticles, for example such as: the nanometer-sized primary particle of nanodiamond; ultra-abrasive carbon black; and, carbon nanohorns, are the firm agglutinates or the bonded assemblies, so that they are insoluble, unmeltable and un-sublimable. Due to this, all the extensive and long term efforts made by many scientists fail to disassemble these assemblies and therefore fail to obtain a single piece of the primary particle of nanocarbon. Therefore, the material properties of carbon nanoparticle are still not reveled to date.

The present invention is among the first to solve a difficult problem inherent in the field of ultra-fine particle technology and the first to obtain the ultra dispersed nanoparticles inquantity, wherein the ultradispersed nanoparticles are considered to be essential materials in realizing the nanotechnology. The gist of the present invention resides in application of a wet milling method and/or similar wet dispersion methods to the assemblies of nanocarbon in their disassembling operations. In a typical example of such disassembling operation of the assemblies, a ball mill is used. Now, such typical example will be described. This type of operations has been used from long ago in the field of particle technology, wherein: a plurality of hard balls of glass or of stainless steel each having a diameter of more than 1 mm are used to prepare a particle of the order of microns.

It seems that: in order to prevent a possible dust explosion from occurring, a conventional dry-type milling operation has been replaced with a wet milling operation for grinding or pulverizing the workpiece material with the use of the balls in the art, where the wet milling operation is performed in a mill chamber in which the workpiece material is rotated together with the balls and a dispersing medium such as water. In order to meet a series of renewed demands for finer particles, the diameter of each ball has been gradually reduced to a value of equal to or less than 1 mm to the present time. This makes it possible for the wet milling method to prepare a particle having a diameter of the order of nanometers.

The mechanism of ball milling operation through which the workpiece material is disassembled or decomposed into the primary particle of nanocarbon is as follows:

(1) The balls received in the mill chamber are driven at high speed by centrifugal forces produced by a stirring blade of an agitator, wherein the stirring blade rotates at high speed within the mill chamber to launch the balls at an end portion of the blade, so that each of the balled thus launched at high speed is capable of obtaining a large amount of energy sufficient to break the C—C bond;

(2) There is no fear that a harmfully localized heating of the mill chamber occurs due to an undestructive "idle" collision between each ball and an inner wall of the mill chamber, because the heat generated by the "idle" collision is effectively absorbed by means of water, the wet solvent medium and/or the balls themselves together with the inner wall of the mill chamber;

(3) When the balls traveling at high speed collide against the assemblies such as the agglutinates and the bonded assemblies to disassemble them, the chemical links such as the C—C bonds are broken to produce radicals carrying uncombined electrons, wherein the uncombined electrons immediately react with surrounding water and like dispersing media to saturate and stabilize in valence the thus disassembled products, whereby any undesired side reaction such as decomposition and polymerization is prevented from occurring in the mill chamber.

Another important factor contributing to accomplishment of the present invention is irradiation of the high-energy ultrasonic waves. Disassembling process of the aggregate formed by van der Waals forces is performed by a weak shock wave produced by cavitation occurring in the dispersing medium such as water. Due to this, the above disassembling process is not directly, and therefore poor in effect in comparison with the wet milling method. However, the disassembling process is free from any fear that some side products are produced in operation. In addition, the disassembling process is clean and simple in operation. Due to this, the above disassembling process is used in the present invention to prevent the primary particles of nanocarbon dispersed in a mono-dispersed state in the dispersing medium such as water. Here, special attention should be added to the following matter: namely, once the dispersing medium is vaporized, re-aggregation occurs immediately to form a re-aggregate structure in a dry condition. Such dry-type re-aggregate structure is much harder than a corresponding wet-type re-aggregate structure which is formed in a wet condition in the dispersing medium. This is because: in the wet-type re-aggregate assembly, re-aggregation is not completely accomplished due to the presence of solvates incorporated in the wet-type re-aggregate assembly, so that the wet-type re-aggregate eventually balances in proportion with the solvates and is therefore finally decreased in hardness; on the other hand, in the dry-type re-aggregate assembly, re-aggregation is fully completed so that the entire aggregation energy of the dry-type re-aggregation assembly reaches a huge amount.

Due to this, once the dry-type re-aggregate assembly is formed, it is necessary a huge amount of energy is required to disassemble such dry-type re-aggregate assembly.

Next, preferred embodiments of the present invention will be described.

A method of manufacturing the ultradispersed primary particle of nanocarbon is carried out using a conventional apparatus such as: a boll mill; an ultrasonic wave generator; a dynamic laser light scattering measurement apparatus; and, the like.

However, even when the today's most advanced apparatuses are used, it is not possible for those skilled in the art to make the present invention. Here, the inventors of the subject application would like to emphasize the novelty of the present invention. In other words, any one of the primary particles of the nanocarbons obtained according to the present invention is a novel material, which has substantially the same size as that of a molecule in the field of chemistry. Due to this, except for C60 fullerene estimated that its behavior is controlled under rules of the general quantum mechanics, the primary particles of the nanocarbons obtained in the present invention are still not investigated in their properties in detail.

Further, even when the primary particle is obtained in the mono-dispersed state, it is not possible to accomplish the objects of the present invention when re-assembly of the primary particles is prevented from occurring. According to the microscopic reversibility principle ruling the molecular world, the same mechanism as that of assembling/disassembling of the primary particles of nanocarbons is also effective in the case of re-assembling of the primary particles of nanocarbons. Due to this, it is considered that the re-aggregation mechanism is classified into at least three types comprising a first type, a second type and a third type, wherein: the first type is of the aggregate assembly formed by van der Waals forces; the second type is of the agglutinate assembly; and, the third type is of the bonded assembly.

One of the most simplest methods for preventing the re-aggregate assembly from being formed by van der Waals forces is: to reserve the primary particle of nanocarbon in the thinnest possible colloidal condition in water or in other dispersing media; to replace water or other dispersing media with an inert gas such as nitrogen gas and the like; and, to store the thus obtained primary particle in a hermetically sealed condition in a cool and dark place.

In general, one of the most effective method for reserving the primary particle is to reserve the primary particle in the dispersing medium, because the dispersing medium combines with each nanoparticle in surface to form a solvate which prevents the inter-particle contact of the primary particles from occurring in the dispersing medium. Addition of a suitable surface-active agent is also effective. In this case, preferably a simple and not expensive salt should be added to keep a zeta potential of each primary particles at an appropriate value in the dispersing medium. It is strictly prohibited to use an ordinary pulverizing method, an ordinary heating/drying method and like ordinary methods as they are with respect to the particles each having a diameter of equal to or less than the order of microns. Incidentally, when re-assembling of the primary particles of nanocarbon occurs by accident, it is possible to solve such re-assembling accident in a relatively easy manner by performing an appropriate ultrasonic wave treatment in the dispersing medium.

On the other hand, as for the re-agglutination of the agglutinate assembly and the re-assembling of the bonded assembly, it is very difficult to solve such re-agglutination accident of the agglutinate assembly and such re-assembling accident of the bonded assembly by using a conventional disassembling method. When the ball milling operations are repeatedly performed, the manufacturing cost of the primary particles of nanocarbons in the mono-dispersed condition increases. In this case, there is a fear of contamination of the primary particle, which contamination is resulted from breakage of the milling balls. Due to this, it is desirable not to use the ball milling operation as much as possible in order to prevent the primary particles from being contaminated by broken pieces of the milling balls. Since any one of re-agglutination of the agglutinate assembly and re-assembling of the bonded assembly is resulted from recombination of the dangling bonds, it is possible to prevent both the re-agglutination of the agglutinate assembly and the re-assembling of the bonded assembly from occurring by saturating or combining the dangling bonds. Due to this, when disassembling or decomposing of the agglutinate assembly occurs in the dispersing medium by means of the milling balls, it is considered that the carbon radicals thus produced through the milling operation disappear through immediate withdrawal of protons from the dispersing medium. Due to this, it is possible to effectively prevent both the re-agglutination of the agglutinate assembly and the re-assembling of the bonded assembly from occurring by carrying out the wet milling operation in the dispersing medium bearing active hydrogen atoms.

It is always necessary to check the particle size distribution and precisely grasp the conditions of the primary particles of nanocarbons in a series of processes for obtaining the primary particles, wherein the processes comprise a process for preventing the self-assembling each of the aggregate assembly and the agglutinate assembly and a process for preventing the re-assembling of the bonded assembly. One of the simplest quality-control methods available in the art is a dynamic laser light scattering measurement method, in which a dynamic laser light scattering measurement apparatus is used to continuously investigate the particle size distribution.

In this measurement method, however, the particle size is not directly measured. Measured in this measurement method is the light incident on each of the particles suspended in the dispersing medium, wherein such incident light is scattered by each particle and analyzed in variations of an interference period of time of each particle by means of a program incorporated in the apparatus, so that the thus analyzed numerical data is converted into the particle size distribution. Due to this, it is dangerous to trust the numerical data as it is obtained.

Consequently, it is preferable to use a supplementary instrument such as a transmission electron microscope (TEM), a scanning electron microscope (SEM) and an atomic force electron microscope (AFM) in order to visually confirm the measurement results of the particle size distribution obtained by the dynamic laser light scattering (DLS) method. Since the low nanoparticle has a diameter less than the shortest wave length (300 nm) of the visible rays or of light by double digits, such low nanoparticle is invisible to the naked eye. The dispersed low nanoparticle is colorless and transparent in appearance.

EXAMPLE 1

Figure 7:
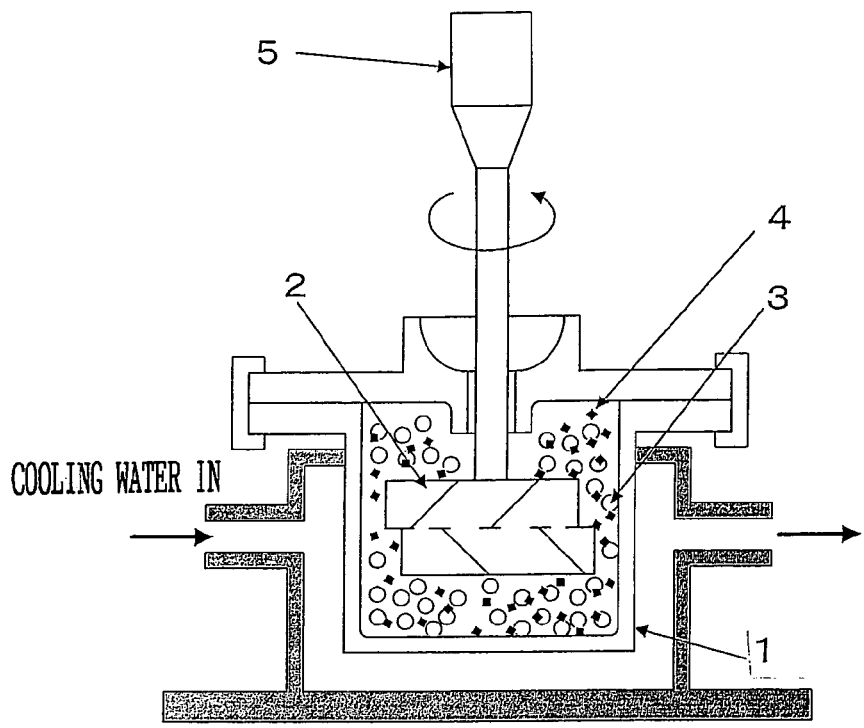
FIG. 7 is a longitudinal sectional view of a ball mill used in Examples.

Used in this Example 1 was a ball mill shown in FIG. 7. Filled to a 70 vol. % of a capacity of a milling container 1 of this ball mill were silica balls 3, wherein the silica balls 3 were prepared using the so-called plasma melt method. Filled together with the silica balls 3 in the milling container 1 were: pure water; and, the agglutinate assemblies or powder of the "detonation method" type nanodiamond, which powder was commercially available and dispersed in the pure water as a workpiece powder 4 to be milled or pulverized. Under such circumstances, a stirring blade of an agitator 2 was rotatably driven at a peripheral velocity of 10 m/s to perform its stirring operations.

After completion of such stirring operation, the milling balls 3 were filtered with the use of a filtration liquid and removed. As a result, a slurry assuming a light gray color was obtained, wherein the slurry was a mixture of washing water and the filtration liquid. The slurry was stable in properties even when exposed to room temperatures in a hermetically sealed container for a period of several weeks. Any of phase separation, precipitation and color change was not observed as to the thus exposed slurry.

Figure 8:
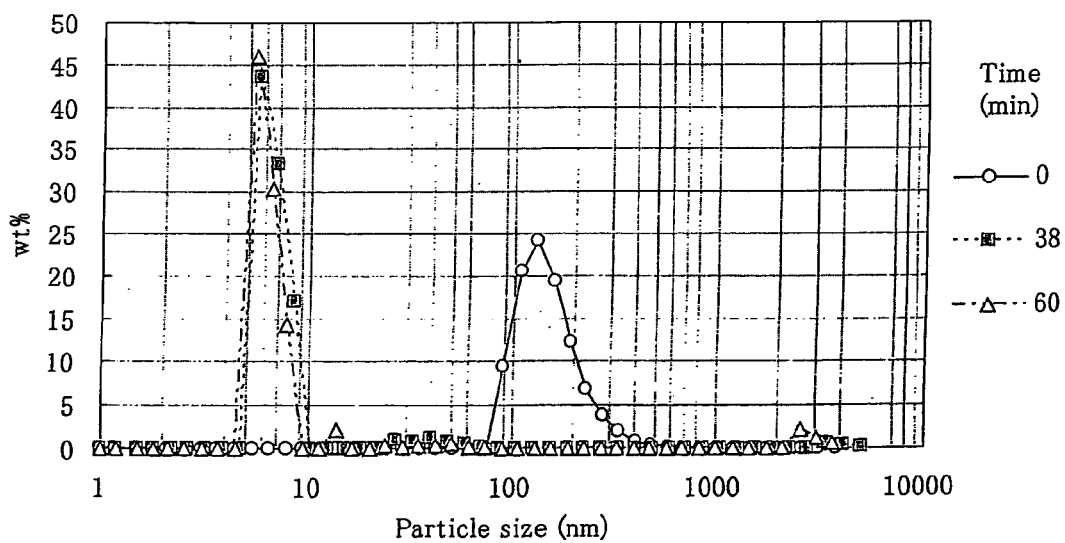
FIG. 8 is a graph showing, in time-varying diameter, each particle of a diamond-slurry used in Example 1.

It was observed that aggregation of the slurry thus obtained was gradually proceeding when the slurry was kept at room temperature for a long period of time, wherein such aggregation was resulted in formation of aggregate assemblies a mean diameter of which reached a value of approximately 105 nm. After that, the slurry, in which slight re-aggregation occurred and the nanodiamonds having been subjected to the ball milling treatment was dispersed, was diluted. Then, the slurry was subjected to a further-milling treatment by exposed to a 200 W-powered 0.5 second duration pulse generated by an ultrasonic wave treatment apparatus called "UP 400S" manufactured by Dr. Hielscher Co., Ltd. The thus obtained slurry was observed through a dynamic laser light scattering-method particle-size measurement apparatus called "FPAR1000" manufactured by Ohtsuka Denshi Co., Ltd. The results of such measurements are shown in FIG. 8, illustrating, in time-varying diameter of each particle, the particle size distribution of the slurry.

After that, the slurry was completely broken up so that dispersion of particles each substantially equal to the size of each primary particle of nanodiamond was realized after a lapse of from approximately 40 minutes to approximately 60 minutes. In other words, the above results would be estimated that: through the first ball milling operation, the particles contained in the slurry were reduced in diameter to the order of the primary particles of nanodiamond; the thus obtained particles were then re-assembled (or re-aggregated) together by van der Waals forces; and, the thus re-assembled particles were then subjected to a low-powered untrasonic wave treatment in the dispersing medium, so that they were disassembled again in the medium.

Figure 9:
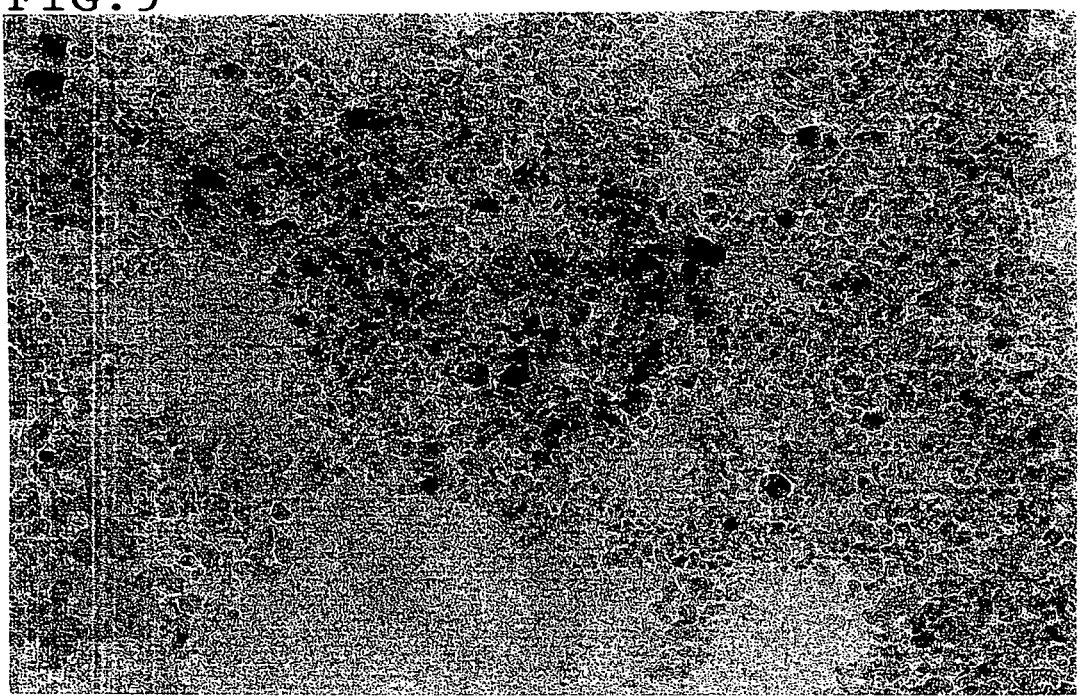
FIG. 9 is a transmission electron micrograph (TEM) of a primary particle of nanodiamond having been treated using a pebble or ball mill.

Next, the particles or colloids contained in the slurry were: spread over a carbon vapor deposited thin film disposed on a TEM specimen holder; dried; and, observed through their transmission electron micrographs using a transmission electron microscope powered at 125 keV. This micrograph is shown in FIG. 9, which illustrates a plurality of well-dispersed primary particles of nanodiamond, wherein: the image of each primary particle is coincident with the corresponding measured data of each primary particle having been previously obtained through the dynamic laser light scattering (DLS) method, and has substantially the same diameter of from 5 nm to 6 nm as that data which is shown in FIG. 8 and was estimated by the DLS method.

On the other hand, a zeta potential of each colloidal particle, which was determined by the so-called "electrophoretic light scattering method" carried out by using the ELS8000 apparatus manufactured by Ohstuka Denshi Co., Ltd., was a relatively large minus value of −39.2 mV at a temperature of 25° C. This was estimated that: since a strong electrostatic repulsion appeared between adjacent ones of colloidal particles in the dispersing medium, the above-mentioned re-assembling was slowly proceeding under the influence of this strong repulsion. After completion of freeze drying of a portion of the slurry, a powder of the thus freeze-dried portion of the slurry was subjected to the so-called X-ray diffraction analyses in which: a crystalline nucleus of diamond was determined in diameter to be a value of 4.3 nm based on a plane strength of (111) plane in the diagram obtained through the X-ray diffraction analyses. From the above results, it was clarified that: by applying the milling conditions described above, the agglutination problem of the primary particles of nanodiamond was completely solved, which was resulted in stable preparation of the primary particles of nanodiamond; and, the low-powered ultrasonic wave treatment was capable of disassembling the aggregate assembly in an easy manner.

Through the above treatments, the ultradispersed primary particles of nanodiamond were obtained in the dispersing medium by overcoming the van der Waals forces, by which forces the primary particles were held together to form the aggregate assembly of the primary particles.

EXAMPLE 2

A black powder of commercially available fullerene C60 was refined twice by vacuum sublimation, where in each vacuum sublimation was performed at a temperature of 600° C. for 30 minutes under a pressure or vacuum of $5\times10^{-6}$ mmHg. It was confirmed, by reversed-phase HPLC (High-Performance Liquid Chromatography) column of Tosoh Co., Ltd. make, that the thus refined C60 powder did not show any peak representing the presence of C70 fullerene, wherein: column crest Pak C18T-5, L250×φ4.6 mm; migration phase was of toluene/ethanol=1/1 in volume ratio with a flow rate of 1.0 ml/m at a temperature of 10° C.; a detection wave length was a value of 335 nm; and, a period of time in which C60 fullerene flowed away was 12.6 minutes.

A 5 grams of the thus refined C60 powder was dispersed into a 70 ml of pure water to prepare a mixture, which mixture was then stirred by a household mixer. After that, the thus stirred mixture was put in a 250 W-powered ultrasonic washing bath for 10 minutes to prepare a finely uniformed dispersion. Then, a 7 ml of this dispersion was mixed with the silica balls each having a diameter of 0.3 mm in the milling container of the ball mill, which was the same as that used in the Example 1, wherein the milling container was filled up to its 70 vol. % with the silica balls. Then, the stirring blade of the agitator was driven at a peripheral velocity of 5 m/s for an hour while water-cooled. After completion of removal of the silica balls from the milling container through a filter, remained in the container was a slurry with a light yellow color in appearance. This slurry was mixed with a washing water to prepare a 30 ml of another slurry. This slurry is very stable. The slurry was then remained in a hermetically sealed container for several weeks at room temperatures. However, any of phase separation, precipitation and color changes was not observed. A portion of this slurry (i.e., colloid) was picked up and dried to obtain a hard dried solid residue, which was then dissolved into toluene to prepare a mixture. After that, this mixture was analyzed using the high-performance liquid chromatography. As a result, there was not found out any evidence of decomposition of C60 fullerene in this analysis.

Through the above treatments, the firm aggregate assembly of the primary particles, which were held together by van der Waals forces in the assembly, was disassembled to make it possible to obtain the primary particles of C60 fullerene in mono-dispersed state in which individual primary particles are separately ultradispersed in the dispersing medium.

EXAMPLE 3

A 10 grams of commercially available ultra-abrasive carbon black (called "Toka Black 8000F") was mixed with a 70 ml of water to prepare a dispersion. In the same manner as that described in the Example 2, a preliminary dispersion treatment of this dispersion was conducted to prepare a uniform suspension. After that, a 7 ml of this suspension was picked up and subjected to a ball milling treatment in the same condition as that employed in the Example 1. after completion of this milling treatment, the milling balls were removed from the milling container using a filter.

Remained in the milling container was a slurry with a gray color in appearance. This slurry was mixed with a washing liquid to prepare a 30 ml of another slurry, which was inspected using the DLS method to determine a mean diameter of colloidal particles in the particle size distribution, wherein the mean diameter was a value of 32 nm.

After that, the thus inspected slurry was subjected to an ultrasonic treatment carried out by an 1 kW-powered ultrasonic treatment apparatus for 10 minutes to become a dispersion. As a result, the colloidal particles in the dispersion are reduced in mean diameter from 32 nm to 20 nm. However, as for the particle size distribution, such distribution was spread toward the side of a larger particle size over a range of 100 nm in width.

It was estimated that: although the colloidal particles corresponding to the primary particles actually dominated the dispersion, a plurality of various-sized segments of the graphite wraps coexisted with the colloidal particles. In this connection, it was also estimated that: when the milling operation further continued, the dispersion would be converted into a suspension bearing only the nanometer-sized graphite particles each having a diameter of several nm.

EXAMPLE 4

According to the above estimation made in the example 3, a 7 ml of the uniform suspension of carbon black having been prepared in the above Example 3 was subjected to the stirring treatment for 4 hours in the same condition as that employed in the Example 3 to perform the ball milling treatment. After completion of such milling treatment, a 10 ml of water was added to the suspension to prepare another suspension. The another suspension was then mixed with the residue liquid remained in the milling container after the balls were removed from the milling container by means of a filter, so that a 35 ml of dark gray-colored slurry was prepared. This dark gray-colored slurry was estimated to contain the particles of low nanometer-sized graphite, and therefore mixed with the same 35 ml of toluene to prepare a toluene-mixed slurry. After that, the toluene-mixed slurry was subjected to a high-speed magnetic stirring treatment for one hour while circulated and heated. As a result, the resultant slurry was provided with a supernatant liquid in its organic layer, wherein: the supernatant liquid assumed red color, and was found out by the HPLC analysis that the supernatant liquid contained both C60 and C70 fullerenes therein.

Through the above treatments, it was possible to obtain the ultradispersed primary particles of nanocarbon by disassembling the agglutinate assembly of the primary particles, wherein the agglutinate assembly was of inclusion type wrapped with thin layers of highly defective graphite.

EXAMPLE 5

A 5 grams of a light-weight and black-colored powder of carbon nanohorn produced by Tsukuba Kenkyusho of NEC Co., Ltd. was suspended in a 7 ml of pure water to prepare a suspension. This suspension was then subjected to irradiation of ultrasonic waves for 10 minutes in the same condition as that of the Example 2, wherein: irradiation of the ultrasonic waves were made by a small-sized piezoelectric transducer of a 400 W-powered ultrasonic treatment apparatus; and, the transducer was inserted into the suspension. After removal of the balls from the milling container through a filter, remained in the container was a light-gray-colored slurry which was then mixed with a washing liquid to prepare another slurry of 25 ml. The another slurry was so stable that: when the slurry was remained in a hermetically sealed container for several weeks at room temperatures, any of phase separation, precipitation, color change was not observed. A drop of the another slurry was put on a carbon vapor deposition film of the TEM specimen and water contained in the slurry was removed to have the residue of the slurry deposited on the film of the TEM specimen. Such residue was observed through the transmission electron microscope (TEM) and found out that: the dahlia-like shaped agglutinate large-sized assembly having a diameter of several tens nm having been observed before performing the ball milling treatment was substantially eliminated; and, only a large number of dahlia-like agglutinate assemblies each having a diameter of several tens nm were observed, wherein each of the dahlia-like agglutinate assemblies assumed a conical shape having a length of approximately 10 nm at its muximum.

Through the above treatment, the agglutinate assembly, in which the primary particles were held firmly together by the graphite wraps, was disassembled. Due to this, it was possible to obtain the ultradispersed primary particles of nanocarbon.

In the above Examples, although only the ball mill was used, it is possible to use the wet dispersion method additionally or simultaneously. Further, in the above Examples, although only the silica balls were used, it is possible to effectively use other ceramic balls. Still further, it is also possible to use any type of balls, for example such as: balls of stainless steels; balls of chrome steels; balls of tungsten carbide; and, balls of any other metals or alloys.

EXAMPLE 6

In this Example 6, a ball mill called "Ultra-apex Mill" manufactured by Kotobuki Giken Kougyo Kabushiki Kaisha was used.

A 10 vol. % of the commercially available "detonation method" type nanodiamond based on an effective volume of a slurry tank was dispersed into water contained in a 500 ml of this slurry tank to prepare a slurry, a 10 vol. % of which slurry was introduced into a milling chamber through a liquid-feed pump. In the milling chamber, an stirring blade was driven at a peripheral velocity of 1.9 m/s in a condition in which a 134 $cm^3$ of zirconia balls was supplied to the milling chamber through a feed opening provided in an upper portion of the milling chamber, wherein: the zirconia balls were commercially available; the total volume of the zirconia balls corresponds to a 80 vol. % of the volume of the milling chamber. In this case, when the balls were filled in the milling chamber, the stirring blade is hard to start its rotation. This was the reason why the balls were gradually filled in the milling chamber in a condition in which the stirring blade already started its rotation at low speed.

After the stirring blade started its rotation, the rotating speed of the stirring blade was gradually increased up to a peripheral speed of 12 m/s. When the peripheral speed of the stirring blade reached this speed of 12 m/s, the stirring blade kept at this speed in rotation. Under such circumstances, the slurry of nanodiamond was continuously supplied at flow rate of 160 ml/minute from the slurry tank through a lower end portion of the milling chamber. The thus supplied slurry flowed upward inside the slurry tank to reach an upper portion of the milling chamber. When the slurry passed through this upper portion of the milling chamber, the slurry encountered a centrifugal separator provided in the upper portion of the milling chamber. Due to this, the balls were separated from the slurry by the centrifugal separator.

The balls thus separated from the slurry was returned to the milling chamber through an opening of an outer peripheral portion of the centrifugal separator. On the other hand, the slurry free from the balls went out of the milling chamber through a central portion of the centrifugal separator, and was then returned to the slurry tank. At this time, the slurry tank was continuously stirred by means of another stirring apparatus in a condition in which nitrogen gas was supplied under pressure to the slurry tank to prevent the environmental atmosphere from entering the slurry tank.

Figure 10:
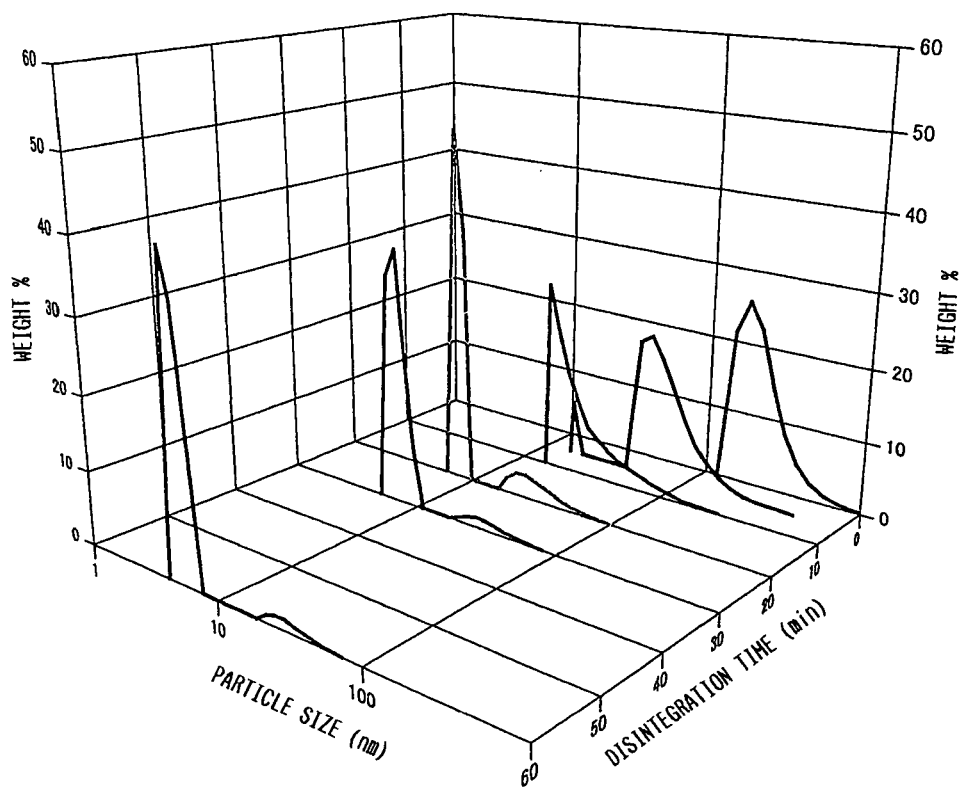
FIG. 10 is a schematic diagram illustrating the time-varying particle size distribution when the aggregates of coarse nanodiamond are broken up using the ball mill.

Therefore, only the slurry was continuously circulated in a condition in which the balls stayed inside the milling chamber, so that disassembling treatment of the assembly of the primary particles was continuously conducted. Due to this, the particles of nanodiamond have their mean diameter swiftly reduced through the milling operation. FIG. 10 is a schematic diagram illustrating the time-varying particle size distribution when the aggregate assemblies of coarse nanodiamond are broken up using the ball mill, wherein: the diagram was prepared by sampling a 0.5 ml of the slurry at predetermined time intervals and determined by the particle-size distribution measurement apparatus (called FPAR-1000) operated according to the dynamic laser light scattering method, wherein: the slurry was sampled after flowed out of the milling chamber; the measurement apparatus was manufactured by Ohstuka Denshi Kabushiki Kaisha; variations of the particle size was not simple; and, the particle size distribution always varied uncontinuously.

Prior to the preliminary disassembling treatment of the agglutinate assemblies of the primary particles of commercially available "detonation method" type nanodiamond by means of the ball mill, the agglutinate assembly was treated for 10 minutes at a rotating speed of 8000 rpm by means of a pulverizing apparatus called "Robomi" manufactured by Tokushu Kika Kabushiki Kaisha.

After that, the agglutinate assembly was further treated for 20 minutes by an ultrasonic irradiation apparatus of continuous type provided with "400 Whielscher" sonorod, whereby the agglutinate assemblies each having a diameter of the order of microns and composed of the primary particles of commercially available nanodiamond were substantially eliminated. This is shown in FIG. 10 by a curve representing the disassembling period of time of 0 minute, wherein the curve shows a group of relatively small-sized assemblies each having a mean diameter of 200 nm. Such 200 nm-sized assemblies were affected in properties even when subjected to the ultrasonic treatment.

In a condition in which the assemblies each having a diameter of at least the order of microns were already eliminated, the 200 nm-sized assemblies of the primary particles were disassembled by the ball mill for the disassembling period of time shown in FIG. 10. The particle size distribution of the assemblies prior to the milling operation of the ball mill is shown in FIG. 10. After the milling operation of the ball mill starts, a peak of the 18.1±2.3 nm-sized particles appears in several minutes as shown in the curve of the disassembling time of 5 minutes assuming a mountain-like shape, as shown in FIG. 10. This illustrates that: for a lapse of 10 minutes from the start of the milling operation, a reduction rate of the balls (shown in vol. %) continuously increases and then swiftly returns to zero. Consequently, the peak of the 18.1±2.3 nm-sized particles appearing in several minutes is considered to correspond to production of an unstable-phase intermediate product appearing in the disassembling operation. After that, in 20 minutes, a peak of the 7.8±0.8 nm-sized particles appears to immediately occupy a 85 wt. % of the particles. After that, as shown in FIG. 10, the reduction rate of the particles increases and then gradually decreases to reach the final value of 5.2±0.4 nm. This particle size is slightly larger than a corresponding size (4.4 nm) of the image of a crystalline nucleus of diamond obtained by the measured radius width of X-ray diffraction analysis data of a (111) crystalline plane. However, at this time, when the disassembling operation is further continued, the milling balls are damaged. Therefore, the milling operation is stopped at this time. In other words, at this time, disassembling of the agglutinate assemblies of the primary particles are substantially completed to obtain the primary particles in the mono-dispersed state in the dispersing medium.

In 20 minutes from the start of the milling operation, a wide-width peak appears around a value of approximately 30 nm. However, the reduction rate at this peak gradually reduces to reach the final value of 5 wt. %. this peak appears later and lasts the end of the milling operation. In view of the particle size distribution at this peak being substantially symmetrical in pattern with a right half of the pattern being symmetrically arranged with the remaining left half of the pattern, it is estimated that: the primary particles are re-assembled to produce secondary particles.

Figure 11:
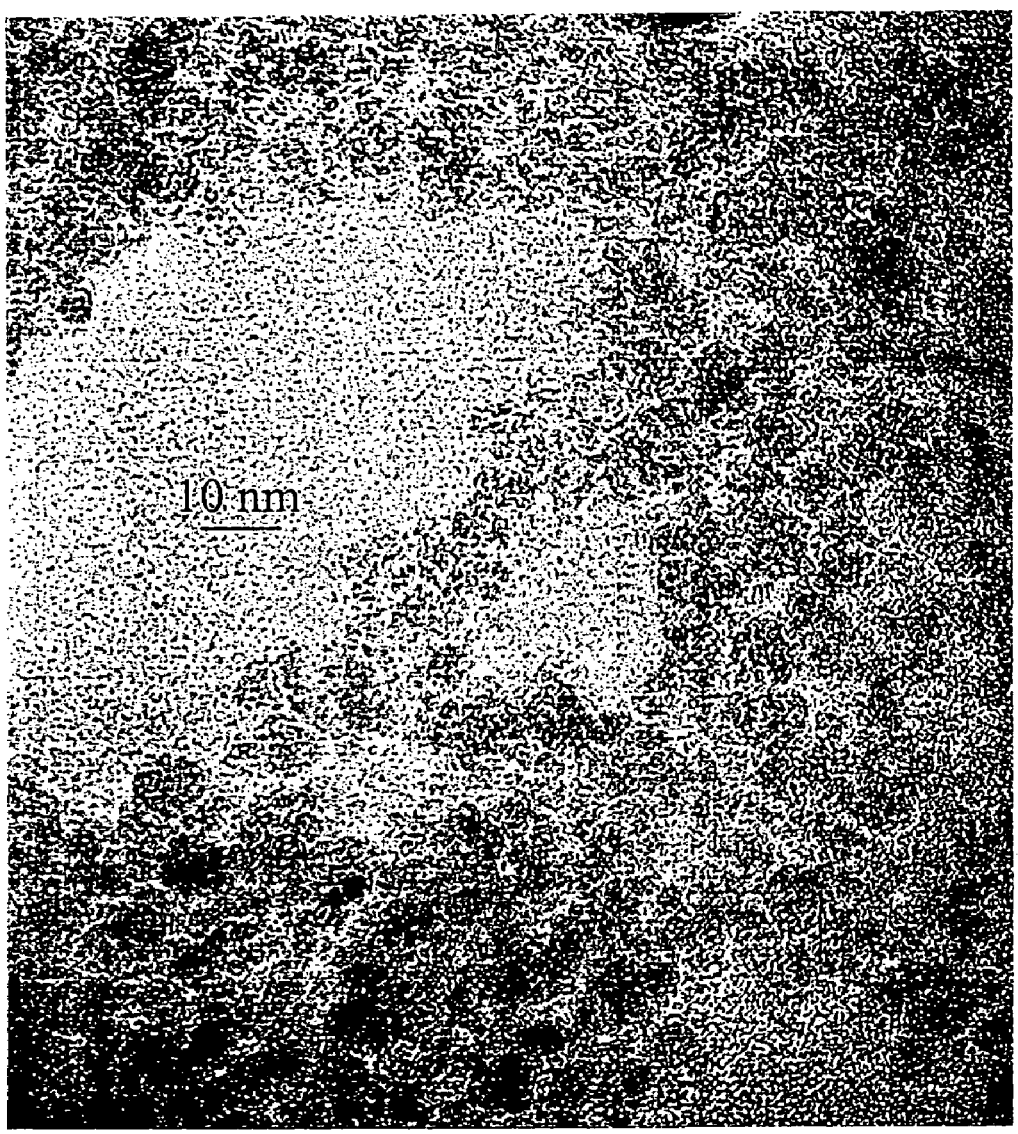
FIG. 11 is a transmission electron micrograph (TEM) of the primary particles of the aggregates of the coarse nanodiamond after completion of crashing operation of the aggregates using the ball mill.

FIG. 11 shows a transmission electron micrograph (TEM) of the primary particles of the aggregate assembly of the coarse nanodiamond after completion of the milling or crashing operation of the aggregate assembly using the ball mill, wherein: the slurry was subjected to the milling operation for 60 minutes; and the micrograph shows that the primary particle of nanodiamonds each having a diameter of equal to or less than 5 nm; the primary particle of nanodiamonds resembles a polyhedral body in shape.

EXAMPLE 7

The same apparatus as that shown in FIG. 7 was used in carrying out the ball milling operation.

In this Example 7: the milling chamber having a volume of 25 ml, a diameter of 35 mm and a height of 26 mm was used. The chamber was made of Teflon and provided with a hermetically sealable but openable lid member. Provided in a central portion of this lid member was a pipe made of SUS 44OC. This pipe having a length of 55 mm and a diameter of 5 mm at maximum passed through an opening of the central portion of the lid member through an O-ring together with an oil seal to have its front end portion provided with a stirring blade made of Teflon. The stirring blade had a diameter of 25 mm and a width of 12 mm. A water-cooled jacket placed around the milling chamber to have a cooling medium or water circulated through the jacket during the milling operation conducted in the milling chamber. Loaded into this milling chamber were: a plurality of silica balls each having a diameter of 0.1 mm and manufactured by Koshuha Neturen Kabushiki Kaisha; a workpiece material, which was aggregate assemblies of the primary particles of nanocarbon; a dispersing medium, which is isopropyl alcohol, into which the aggregate assemblies were dispersed at a predetermined ratio of (the aggregate assemblies to the dispersing medium) to form a slurry with which the milling chamber was filled. After a lapse of a predetermined period of time, the stirring blade was rotatably driven at high peripheral speed for a predetermined period of time in a condition in which the milling chamber was hermetically sealed. After that, the contents of the milling chamber were retrieved from the chamber. As for the milling balls, they were separated and removed from the contents using a suitable filter means such as a screen or sieve with properly-sized meshes. After that the residue of the contents was inspected to check the degree of disassembling of the assemblies of the primary particles by testing each colloidal particle of carbon nanoparticles thus disassembled from the assemblies.

Figure 3A:
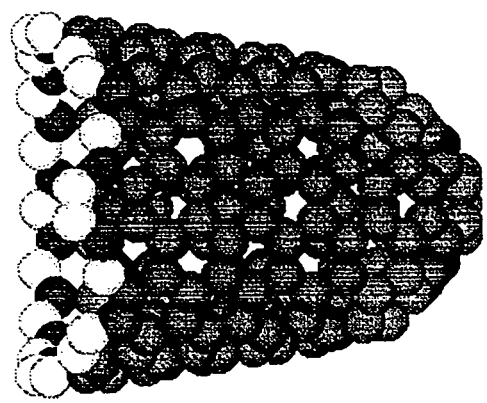
FIG. 3a is a schematic diagram of primary particles of carbon nanohorn.
Figure 3B:
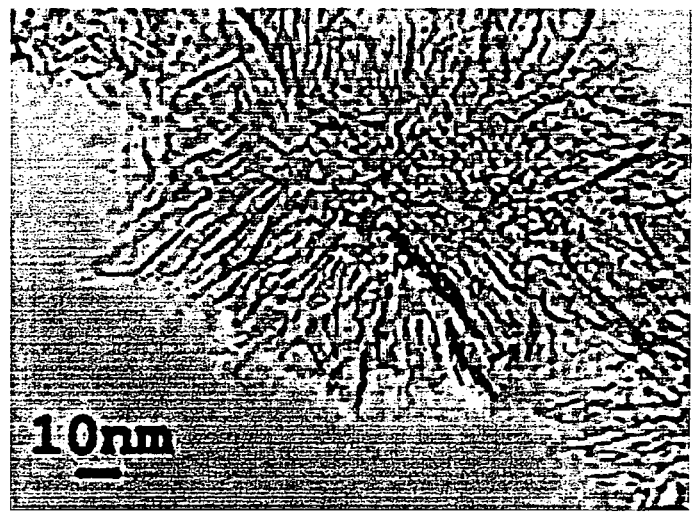
FIG. 3b is a transmission electron micrograph (TEM) of the bonded assemblies of aggregates of carbon nanohorns.
Figure 12:
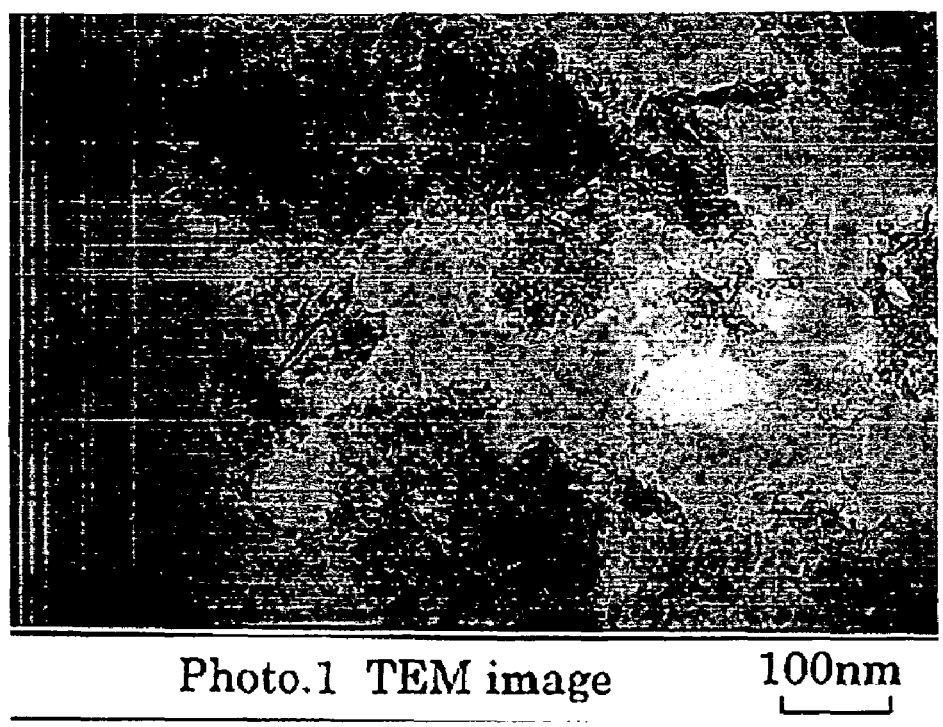
FIG. 12 is a transmission electron micrograph (TEM) of a colloid obtained through the crashing operation of the aggregates of the coarse nanodiamond using the ball mill.
Figure 13:
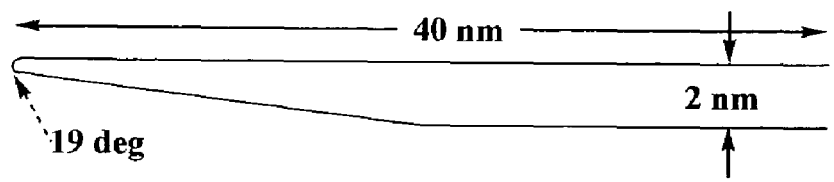
FIG. 13 is a schematic diagram of an ideal image of a simple, ordinary nanohorn.

A slurry, in which a concentration of carbon nanohorns prepared by "Nihon Denki Co., Ltd." was 0.3 wt. %, was stirred for 3 hours by the stirring blade driven at a peripheral speed of 10 m/s. After that, all the milling balls were screen out of the thus stirred slurry to obtain a transparent black-colored colloidal particles dispersed in the slurry or dispersing medium. FIG. 12 shows a transmission electron micrograph (TEM) of the colloid obtained through the milling or crashing operation of the aggregate assemblies of the coarse nanodiamond using the ball mill. As is well known, all the carbon nanohorns in the aggregate assemblies still not disassembled had their vertex portions oriented radially outwardly so that each of the aggregate assemblies of the primary particles eventually assumed such a dahlia-like shape as a whole. As shown in FIG. 12, after completion of the ball milling operation, substantially all the aggregate assemblies of the nanohorns were completely disassembled. After that, as is clear from FIG. 3b, the individual primary particles resulted from the above disassembling are re-assembled to form new or secondary aggregate assemblies. In view of a plurality of the transmission electron micrographs of the secondary aggregate assemblies, it seems that: each of the secondary aggregate assemblies has a diameter of from 20 nm to 200 nm in conclusion.

EXAMPLE 8

Used in this Example 8 was a slurry containing a concentration of 1.5 wt. % of a black-colored powder of C60 fullerene, which was prepared by Tokyo Kasei Co., Ltd., wherein: the black powder was 99.9% pure fullerene C60. This black powder was then stirred for 3 hours in the agitator at a peripheral speed of 10 m/s of the stirring blade to prepare a mixture, of which mixture all the balls were screened out, so that the remaining slurry free from all the balls was transparent and dark orange-colored in appearance and still contained a concentration of 1.5 wt. % of the black powder. This remaining slurry was inspected using the transmission electron microscope (TEM).

Figure 14:
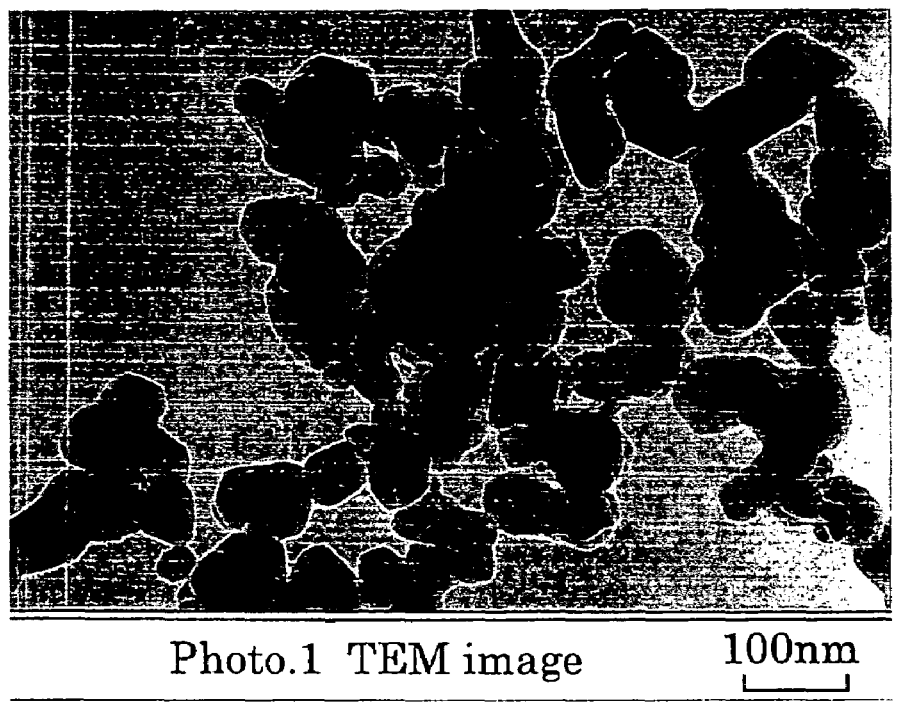
FIG. 14 is a transmission electron micrograph (TEM) of a colloid obtained through a crashing operation of a powder of aggregates of the commercially available C60 fullerene by using the ball mill.

FIG. 14 shows a transmission electron micrograph (TEM) of a colloid obtained through the milling operation of the powder of the aggregate assemblie of the commercially available C60 fullerene by using the ball mill. As is clearly shown in FIG. 14, each colloidal particle assumes a rounded polyhedral-body-like shape resembling substantially a spherical shape. These colloidal particles, as observed in FIG. 14, are relatively uniform in shape. These colloidal particles were confirmed to have a mean diameter of 60±13 nm using the measurement results of the particle size distribution of these colloidal particles, wherein: the measurements were made using the particle-size distribution measurement apparatus operated by the dynamic laser light scattering (DLS) method; and, the measurement apparatus was manufactured by Ohtsuka Denshi Kabushiki Kaisha.

Heretofore, intensive researches have been made to obtain the primary particles of C60 fulerene, wherein: each primary particle has a diameter of 1 nm obtained by disassembling the assemblies of the primary particles in the dispersing medium such as a poor solvent represented by water and/or alcohols. However, up to the present time, any of such intensive researches fails to obtain the primary particles of C60 fullerene in the so-called mono-dispersed state in the dispersing medium.

In the latest research: toluene, tetrahydrofuran or like solvent, in which the C60 fullerene is relatively high in solubility, is first prepared as the dispersing medium; then, the thus prepared solvent or dispersing medium is poured into a large amount of water to prepare a mixture; then, all the organic solvent is expelled from the mixture using an ultrasonic treatment or blowing a gas of nitrogen atoms into the mixture, whereby a transparent water-based colloid of C60 fullerene has been successfully prepared to date.

However, even in this latest successful experiment for preparing the colloid of C60 fullerene, the aggregate assembly the thus finally obtained has a diameter of approximately 60 nm.

In the present invention clarified through the above Examples, there is shown for the first time in the art the possibility of mass-production of the transparent colloid comprising the aggregate assemblies of C60 fullerene by the use of the ball milling method carried out in the poor solvent, the assemblies having the same properties.

Now, applicability in industry of the present invention will be described.

As described above, the present invention makes it possible for the first time in the art to obtain the primary particles of nanocarbon in quantity in the so-called mono-dispersed state in the dispersing medium. Due to this, it is expected that: the primary particles of nanocarbons, which particles are dispersed in the mono-dispersed state in the dispersing medium and obtained in quantity, will be widely used as the most essential material in various aspect of the field of nanotechnology in the near future.

Even in the present time, it is possible to use the primary particles of nanocarbon obtained according to the present invention in the following fields of application: for example, As an Abrasive Material In the field of abrasive material, it is possible to directly use the primary particles of the present invention as they are without any modification, because these primary particles have been already dispersed in water as an abrasive material. This abrasive application or use of the primary particles of the present invention is particularly useful in the field of ultra-precision polishing technology for polishing, for example such as: a substrate of a hard disk drive; a magnetic head; a fiber optic communication terminal coupling portion; a silicon wafer; and/or, a sapphire wafer.

As a Lubricant Material

In the field of lubricant material, the primary particles of nanocarbon of the present invention is capable of serving as a nano-bearing ball, provided that the primary particles are chemically combined with fluorine atoms to become perfluorine compounds.

As a Sintering Material

In the field of sintering material, the primary particles of polycrystalline nanodiamond of the present invention are capable of being sintered to produce a diamond tool. Further, the primary particles of the present invention may be sintered by a detonation shock wave to form a diamond tool. Particularly, a sintered product made of the primary particles of the present invention may be widely used in the field of ultra-precision polishing application in the near future. Due to this, this type of sintered product is the most interesting product and therefore very important, because there is a large amount of demand for this type of sintered product made of the primary particles of the present invention.

As an Artificial Bulk Diamond

In the field of artificial bulk diamond, the primary particles of the present invention is capable of being formed or synthesized into a relatively large-sized artificial diamond product by the "chemical vapor deposition (CVD)" method or by the static ultra-high pressure synthesizing method, provided that: in the former CVD method, a crystalline nucleus of diamond grows gradually in an active atmosphere to eventually a relatively large-sized artificial diamond; and, the latter synthesizing method is carried out at a very high temperature under a static ultra-high pressure to make the artificial diamond.

As an E-E Electrode Material

In the field of E-E electrode material, a large amount of positive affinity of nanodiamond for electrons is effectively utilized to form the E-E electrode.

As a Coating Material

In the field of coating material, a relatively large amount of aggregation energy inherent in each of the primary particles of the present invention may be effectively used to prepare a coating agent or paint which should be applied to roads, buildings, cars and the like in use.

As a Heat Transfer Material

In the field of heat transfer material, it is possible to effectively use the primary particles of the present invention as: a cooling medium; a heating medium; and, as a direct dispersing agent.

As a Compound

In the field of compound, it is possible to use the primary particles of the present invention as: a nanodiamend-based polymer; a nanodiamond-based synthetic resin; a nanodiamond-based pigment; and, a nanodiamond-based ink.

As for Carbon Nanohorn

The carbon nanohorn of the present invention is capable of being used in forming a hydrogen absorption metal in which: each of the primary particles of the present invention is capable of serving as a hydrogen carrier of a fuel cell. Particularly, it is possible for each primary particle of the present invention to reversibly store hydrogen atoms inside each hole of the electrodes of the fuel cell.

As an FE Electrode Material

In the field of FE electrode material, an FE electrode made of the primary particles of the present invention is capable of issuing a stream of low-voltage electrons from a very sharply-pointed front tip portion of the electrode.

As a C60 Fullerene Material

In the field of C60 fullerene material, the primary particles of the present invention are capable of being used as an anti-oxidant for protecting a living organism from harmful oxidation. Since the primary particles of C60 fullerenes dispersed in water in he mono-dispersed state are very stable as is well known in the art, it is possible for the primary particle of the present invention to serve as an effective catcher for catching the most-active radicals inside the living organism, which radicals are one of essential factors of aging of the living organism.

As a Carbon Black Material

In the field of carbon black material, the nano-graphite of the present invention is expected to be superior to the conventional conductive micron-sized graphite in many aspects of material properties.

Finally, the present application claims the Convention Priority based on Japanese Patent Application No. 2003-141618 filed on May 20, 2003, which is herein incorporated by reference.

What is claimed is:

1. A method of manufacturing an ultradispersion of primary particles of nanometer-sized carbon, comprising:
   applying a wet milling method to an aggregate structure of said primary particles of nanometer-sized carbon to overcome van der Waals forces, by which forces said primary particles of nanometer-sized carbon are held together to form said aggregate structure, wherein said wet milling method is carried out with balls as a breaking medium, each of the balls having a diameter less than or equal to 0.1 mm.

2. The method of manufacturing as set forth in claim 1, wherein said structure is subjected to said wet milling method in water or in an organic solvent.

3. The method of manufacturing as set forth in claim 1, wherein, after completion of said wet milling method, said primary particles of nanometer-sized carbon are subjected to an ultrasonic treatment, whereby said primary particles of nanometer-sized carbon are prevented from recombining with each other.

4. The method of manufacturing as set forth in claim 1, wherein, after completion of said wet milling method, said primary particles of nanometer-sized carbon are subjected to an ultrasonic treatment, whereby said primary particles of nanometer-sized carbon are prevented from recombining with each other, wherein said structure is subjected to said wet milling method in water or in an organic solvent.

5. The method of manufacturing as set forth in claim 1, wherein said wet milling method is carried out in an agitator at a peripheral velocity of equal to or more than 5 m/sec with the use of the balls, the balls comprising ceramic balls or metallic balls.

6. The method of manufacturing as set forth in claim 1, wherein said wet milling method is carried out in a solvent having active hydrogen atoms to prevent said primary particles from recombining with each other.

7. A method of manufacturing an ultradispersion of primary particles of nanometer-sized carbon, comprising:
   applying a wet milling method to an agglutinate structure of said primary particles of nanometer-sized carbon to break up said agglutinate structure, wherein said agglutinate structure is an inclusion with thin layers of highly defective graphitic curved layers surrounding core nanocarbon particles, wherein said wet milling method is carried out with balls as a breaking medium, each of the balls having a diameter less than or equal to 0.1 mm.

8. A method of manufacturing an ultradispersion of primary particles of nanometer-sized carbon, comprising:
   applying a wet milling method to a high-order interparticle direct covalent bonding structure of said primary particles of nanometer-sized carbon to decompose said covalent bonding structure, wherein said wet milling method is carried out with balls as a breaking medium, each of the balls having a diameter less than or equal to 0.1 mm.

9. A method of manufacturing a mono-molecular dispersion of fullerenes, comprising:
   applying a wet milling method to an aggregate structure of said fullerenes, whereby van der Waals forces by which said fullerenes are held together to form said aggregate structure are overcome, wherein said wet milling method is carried out with balls as a breaking medium, each of the balls having a diameter less than or equal to 0.1 mm.

10. A method of manufacturing an ultradispersion of primary particles of graphite, comprising:
    applying a wet milling method to an agglutinate structure of a super anti-abrasive carbon black to break up said agglutinate structure, wherein said agglutinate structure is an inclusion with thin layers of highly defective graphitic curved layers surrounding core graphite particles, wherein said wet milling method is carried out with balls as a breaking medium, each of the balls having a diameter less than or equal to 0.1 mm.

11. A method of manufacturing an ultradispersion of primary particles of nanometer-sized diamond, comprising:
    applying a wet milling method to an agglutinate structure of nanometer-sized synthetic diamond powder manufactured by a shock wave synthesis procedure, whereby said agglutinate structure is broken up to provide said ultradispered primary particles of nanometer-sized diamond, wherein said agglutinate structure is of an inclusion with thin layers of highly defective graphitic layers surrounding core nanodiamond particles, wherein said wet milling method is carried out with balls as a breaking medium, each of the balls having a diameter less than or equal to 0.1 mm.

12. A method of manufacturing an ultradispersion of primary particles of nanometer-sized horn, comprising:
    applying a wet milling method to a high-order interparticle direct covalent bonding dahlia structure of said primary particles to decompose said dahlia structure, wherein said wet milling method is carried out with balls as a breaking medium, each of the balls having a diameter less than or equal to 0.1 mm.

* * * * *